United States Patent
Gholamipour et al.

(10) Patent No.: US 10,540,100 B2
(45) Date of Patent: Jan. 21, 2020

(54) MAPPING-BASED WEAR LEVELING FOR NON-VOLATILE MEMORY

(71) Applicant: Western Digital Technologies, Inc., San Jose, CA (US)

(72) Inventors: Amir Hossein Gholamipour, Irvine, CA (US); Chandan Mishra, Irvine, CA (US); Daniel Helmick, Broomfield, CO (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 0 days.

(21) Appl. No.: 15/949,976

(22) Filed: Apr. 10, 2018

(65) Prior Publication Data

US 2019/0310780 A1    Oct. 10, 2019

(51) Int. Cl.
*G06F 3/00*      (2006.01)
*G06F 3/06*      (2006.01)
*G06F 12/1009*   (2016.01)

(52) U.S. Cl.
CPC .......... *G06F 3/0616* (2013.01); *G06F 3/0647* (2013.01); *G06F 3/0679* (2013.01); *G06F 12/1009* (2013.01); *G06F 2212/1036* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 5,754,871 A | 5/1998 | Wilkinson et al. | |
| 7,774,575 B2 | 8/2010 | Seto et al. | |
| 8,019,925 B1 | 9/2011 | Vogan et al. | |
| 8,667,301 B2 | 3/2014 | Farrugia et al. | |
| 8,806,171 B2 | 8/2014 | Seong et al. | |
| 2014/0052899 A1 | 2/2014 | Nan | |
| 2015/0052291 A1* | 2/2015 | Shibata | G06F 12/0246 711/103 |

\* cited by examiner

*Primary Examiner* — Midys Rojas
(74) *Attorney, Agent, or Firm* — Kunzler Bean & Adamson, PC

(57) ABSTRACT

Apparatuses, systems, and methods are disclosed for mapping-based wear leveling for non-volatile memory. An apparatus may include one or more non-volatile memory elements, and a controller. A controller may maintain a logical-to-physical mapping for converting logical addresses to physical addresses. A logical-to-physical mapping may include a translation table that associates groups of logical addresses with groups of physical addresses, and one or more mathematical mappings. A mathematical mapping for a group of logical addresses may associate individual logical addresses within the group of logical addresses with individual physical addresses within a corresponding group of physical addresses. A controller may change at least one mathematical mapping. A controller may move data based on at least one changed mapping.

20 Claims, 11 Drawing Sheets

300a

| Logical Address Group 302 | Physical Address Group 304 | Mapping 306 |
|---|---|---|
| 1 | 7 | $PA = f_1(LA)$ |
| 2 | 1 | $PA = f_2(LA)$ |
| ... | ... | ... |
| N | 5 | $PA = f_N(LA)$ |

| Logical Address Group 302 | Physical Address Group 304 | Mapping 306 |
|---|---|---|
| 1 | 7 | $PA = f_1(LA)$ |
| 2 | 1 | $PA = g_2(LA)$ |
| ... | ... | ... |
| N | 5 | $PA = f_N(LA)$ |

| LA 1002 | Bit X'd 1004 | Swap Index 1006 |
|---|---|---|
| 0 0 0 | 00 | 0 |
| 0 0 1 | 01 | 1 |
| 0 1 0 | 00 | 0 |
| 0 1 1 | 01 | 1 |
| 1 0 0 | 10 | 2 |
| 1 0 1 | 11 | 3 |
| 1 1 0 | 10 | 2 |
| 1 1 1 | 11 | 3 |

| Old Mask 1010 | 001 |
|---|---|
| New Mask 1012 | 011 |
| Difference 1014 | 010 |

| Swap Index 1006 | Pair Swap 1008 |
|---|---|
| 0 | 0 0 0 / 0 1 0 |
| 1 | 0 0 1 / 0 1 1 |
| 2 | 1 0 0 / 1 1 0 |
| 3 | 1 0 1 / 1 1 1 |

Delay 1016

| LA 1002 | Bit X'd 1004 | Swap Index 1006 |
|---|---|---|
| 0 0 0 | 00 | 0 |
| 0 0 1 | 01 | 1 |
| 0 1 0 | 10 | 2 |
| 0 1 1 | 11 | 3 |
| 1 0 0 | 00 | 0 |
| 1 0 1 | 01 | 1 |
| 1 1 0 | 10 | 2 |
| 1 1 1 | 11 | 3 |

| Old Mask 1010 | 010 |
|---|---|
| New Mask 1012 | 110 |
| Difference 1014 | 100 |

| Swap Index 1006 | Pair Swap 1008 |
|---|---|
| 0 | 0 0 0 / 1 0 0 |
| 1 | 0 0 1 / 1 0 1 |
| 2 | 0 1 0 / 1 1 0 |
| 3 | 0 1 1 / 1 1 1 |

Delay 1016

FIG. 11

MAPPING-BASED WEAR LEVELING FOR NON-VOLATILE MEMORY

TECHNICAL FIELD

The present disclosure, in various embodiments, relates to non-volatile memory, and more particularly relates to mapping-based wear leveling for non-volatile memory.

BACKGROUND

Various types of non-volatile memory media may have limited endurance. Memory capacity may be lost as memory regions wear out. Mappings between logical and physical addresses for memory media may be changed over time so that repeated writes to a logical address do not cause undue wear at a single physical address. However, providing flexible wear leveling using an any-to-any mapping between a large number of logical addresses and a large number of physical addresses may involve maintaining large amounts of metadata.

SUMMARY

Apparatuses are presented for mapping-based wear leveling for non-volatile memory. In one embodiment, an apparatus includes one or more non-volatile memory elements, and a controller. In a certain embodiment, a controller is configured to maintain a logical-to-physical mapping for converting logical addresses to physical addresses. In a further embodiment, a logical-to-physical mapping may include a translation table that associates groups of logical addresses with groups of physical addresses, and one or more mathematical mappings. In one embodiment, a mathematical mapping for a group of logical addresses may associate individual logical addresses within the group of logical addresses with individual physical addresses within a corresponding group of physical addresses. In a certain embodiment, a controller is configured to change at least one mathematical mapping. In a further embodiment, a controller is configured to move data based on at least one changed mapping.

Methods are presented for mapping-based wear leveling for non-volatile memory. In one embodiment, a method includes storing a logical-to-physical mapping for converting logical addresses to physical addresses. In a certain embodiment, a logical-to-physical mapping may include a translation table that associates groups of logical addresses with groups of physical addresses, and one or more mathematical mappings. In a further embodiment, a mathematical mapping for a group of logical addresses may associate individual logical addresses within the group of logical addresses with individual physical addresses within a corresponding group of physical addresses. In some embodiments, a mathematical mapping may include an XOR map for determining at least a portion of a physical address based on at least a portion of a logical address. In certain embodiments, a method may include changing an XOR map for at least one mathematical mapping. In a further embodiment, a method may include swapping data between physical addresses based on a changed XOR map.

An apparatus, in another embodiment, includes means for mapping a first portion of a logical address to a group of physical addresses. In one embodiment, an apparatus includes means for applying an XOR mask to a second portion of a logical address to determine a physical address within a group of physical addresses. In a certain embodiment, an apparatus includes means for changing an XOR mask. In a further embodiment, an apparatus includes means for swapping data between physical addresses within a group, based on a changed XOR mask.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which:

FIG. 3 is a schematic block diagram illustrating one embodiment of a translation table;

FIG. 4 is a schematic block diagram illustrating another embodiment of a translation table;

FIG. 10 is a schematic block diagram illustrating one embodiment of a swap order for changing a mathematical mapping between logical and physical addresses;

FIG. 11 is a schematic block diagram illustrating another embodiment of a swap order for changing a mathematical mapping between logical and physical addresses;

DETAILED DESCRIPTION

Figure 1:
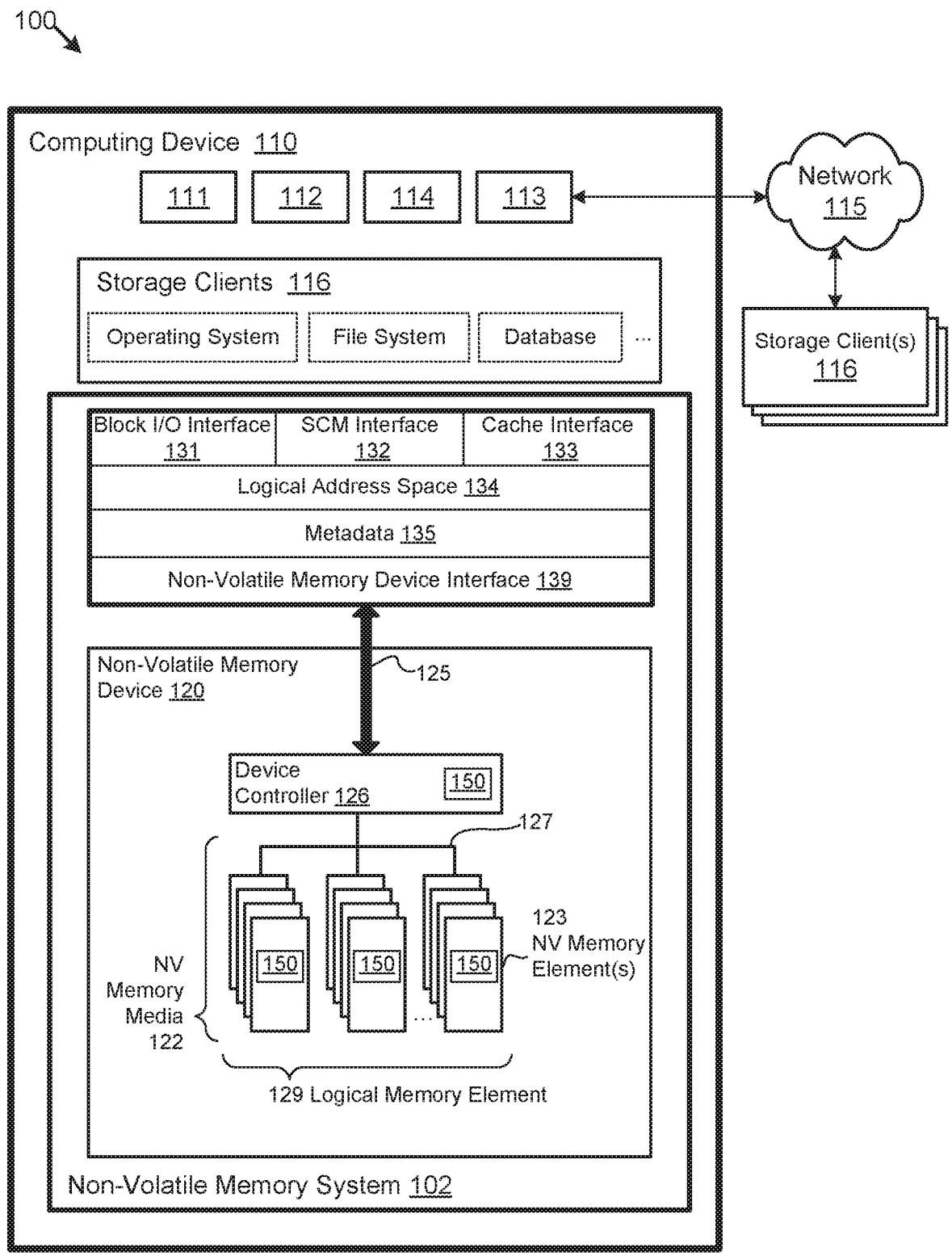
FIG. 1 is a schematic block diagram illustrating one embodiment of a system comprising non-volatile memory elements.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1 is a block diagram of one embodiment of a system 100 comprising one or more map components 150 for a non-volatile memory device 120. Map components 150 may be part of one or more non-volatile memory elements 123, a device controller 126 external to the non-volatile memory elements 123, a device driver, or the like. Map components 150 may be part of a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or device controller 126 to a communication network 115, such as an Internet Protocol (IP) network, a Storage Area Network (SAN), wireless network, wired network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more expansion cards and/or daughter cards, a solid-state-drive (SSD) or other hard drive device, and/or may have another memory and/or storage form factor. The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a Serial Advanced Technology Attachment (SATA) bus, a Parallel Advanced Technology Attachment (PATA) bus, a Small Computer System Interface (SCSI) bus, a FireWire bus, a Fibre Channel connection, a Universal Serial Bus (USB), a PCIe Advanced Switching (PCIe-AS) bus, or the like. In another embodiment, the non-volatile memory device 120 may be disposed on a data network 115, such as an Ethernet network, an Infiniband network, SCSI RDMA over a network 115, a Storage Area Network (SAN), a Local Area Network (LAN), a Wide Area Network (WAN) such as the Internet, another wired and/or wireless network 115, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein.

The non-volatile memory system 102, in the depicted embodiment, includes one or more map components 150. A map component 150, in one embodiment, may maintain a logical-to-physical mapping for converting logical addresses to physical addresses. In certain embodiments, a logical-to-physical mapping may include a translation table that associates groups of logical addresses with groups of physical addresses, and one or more mathematical mappings, that associate individual logical addresses within groups of logical addresses with individual physical addresses within corresponding groups of physical addresses. In a certain embodiment, a controller is configured to change at least one mathematical mapping. In a further embodiment, a controller is configured to move data based on at least one changed mapping.

In various embodiments, wear leveling for non-volatile media may involve changing logical-to-physical mappings over time, and moving data for a logical address to a new physical location. For example, a logical address that is frequently used for write operations may be frequently remapped to different physical addresses, to prevent undue wear at a single physical address. Conversely, a logical address that is not frequently used for write operations may be mapped to a physical address for a location with more-than-average wear, to reduce wear at that physical location. An any-to-any mapping between logical and physical addresses, such as a translation table or other data structure listing a physical address for each logical address, may provide flexible wear leveling by allowing any logical address to be mapped to any physical address. However, any-to-any logical-to-physical mappings may use large amounts of memory for a mapping table or other data structure, and for associated metadata.

By contrast, in certain embodiments, a mathematical mapping may be a mathematical function that returns a physical address as a function of a logical address by performing logical operations, arithmetical operations, or the like, on the logical address. For example, in one embodiment, a mathematical mapping may include a bitmask, and the bitwise exclusive or (XOR) of the bitmask and a logical address may return a physical address corresponding to the logical address. A controller may use significantly less memory for a mathematical mapping than for an any-to-any mapping, by storing parameters (such as a bitmask) for a simple mathematical function instead of a large mapping data structure. However, mathematical mappings may be less flexible than any-to-any mappings for wear leveling. For example, a bitmask that maps a "hot" or frequently written-to logical address to a fresh or unworn physical location may also map a different "hot" logical address to a worn physical address. Thus, in certain embodiments, a map component 150 that uses a translation table to associate groups of logical addresses with groups of physical addresses, and that uses mathematical mappings to associate individual logical address with individual physical addresses within groups, may provide wear leveling by changing a mapping and moving data, and may provide more flexible wear leveling than a strictly mathematical mapping, with less overhead than an any-to-any mapping. Map components 150 are described in greater detail below with regard to FIGS. 2-15.

In one embodiment, a map component 150 may include logic hardware of one or more non-volatile memory devices 120, such as a device controller 126, a non-volatile memory element 123, other programmable logic, firmware for a non-volatile memory element 123, microcode for execution by a non-volatile memory element 123, or the like. In another embodiment, a map component 150 may include executable software code, stored on a computer readable storage medium for execution by logic hardware of a non-volatile memory element 123. In a further embodiment, a map component 150 may include a combination of both executable software code and logic hardware.

In one embodiment, the non-volatile memory device 120 is configured to receive storage requests from a device driver or other executable application via buses 125, 127, a device controller 126, or the like. The non-volatile memory device 120 may be further configured to transfer data to/from a device driver and/or storage clients 116 via the bus 125. Accordingly, the non-volatile memory device 120, in some embodiments, may comprise and/or be in communication with one or more direct memory access (DMA) modules, remote DMA modules, bus controllers, bridges, buffers, and so on to facilitate the transfer of storage requests and associated data. In another embodiment, the non-volatile memory device 120 may receive storage requests as an API call from a storage client 116, as an IO-CTL command, or the like.

According to various embodiments, a device controller 126 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the device controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), a cache line address, a memory address, a cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical-to-physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective device controllers 126 and non-volatile memory media 122. A device driver may provide access to the one or more non-volatile memory devices 120 via a traditional block I/O interface 131. Additionally, a device driver may provide access to enhanced functionality through the storage class memory (SCM) interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more device controllers 126.

A device driver may present a logical address space 134 to the storage clients 116 through one or more interfaces. As discussed above, the logical address space 134 may comprise a plurality of logical addresses, each corresponding to respective media locations the on one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, a fabric, Infiniband, Ethernet, Omnipath, GenZ, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the device controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The device controller 126 is part of and/or in communication with one or more non-volatile memory devices 120. Although FIG. 1 depicts a single non-volatile memory device 120, the disclosure is not limited in this regard and could be adapted to incorporate any number of non-volatile memory devices 120.

The non-volatile memory device 120 may comprise one or more elements 123 of non-volatile memory media 122, which may include but is not limited to: Resistive RAM (ReRAM), Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of non-volatile memory media 122, in certain embodiments, comprise storage class memory (SCM).

While legacy technologies such as NAND flash may be block and/or page addressable, or may use block-level erase operations, storage class memory, in one embodiment, may be byte addressable, and may provide byte-level read and write operations (e.g., write operations may include byte-level program and byte-level erase operations, or may include byte-level write operations capable of overwriting data in place without a previous erase operation). In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like. Similarly, a non-volatile memory element 123, in various embodiments, may comprise a non-volatile recording element, a non-volatile memory element, a non-volatile storage element, or the like.

The non-volatile memory media 122 may comprise one or more non-volatile memory elements 123, which may include, but are not limited to: chips, packages, planes, die, or the like. A device controller 126, external to the one or more non-volatile memory elements 123, may be configured to manage data operations on the non-volatile memory media 122, and may comprise one or more processors, programmable processors (e.g., FPGAs), ASICs, microcontrollers, or the like. In some embodiments, the device controller 126 is configured to store data on and/or read data from the non-volatile memory media 122, to transfer data to/from the non-volatile memory device 120, and so on.

The device controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the device controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The device controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102.

A device driver may further comprise a non-volatile memory device interface 139 that is configured to transfer data, commands, and/or queries to the device controller 126 over a bus 125, as described above.

Figure 2:
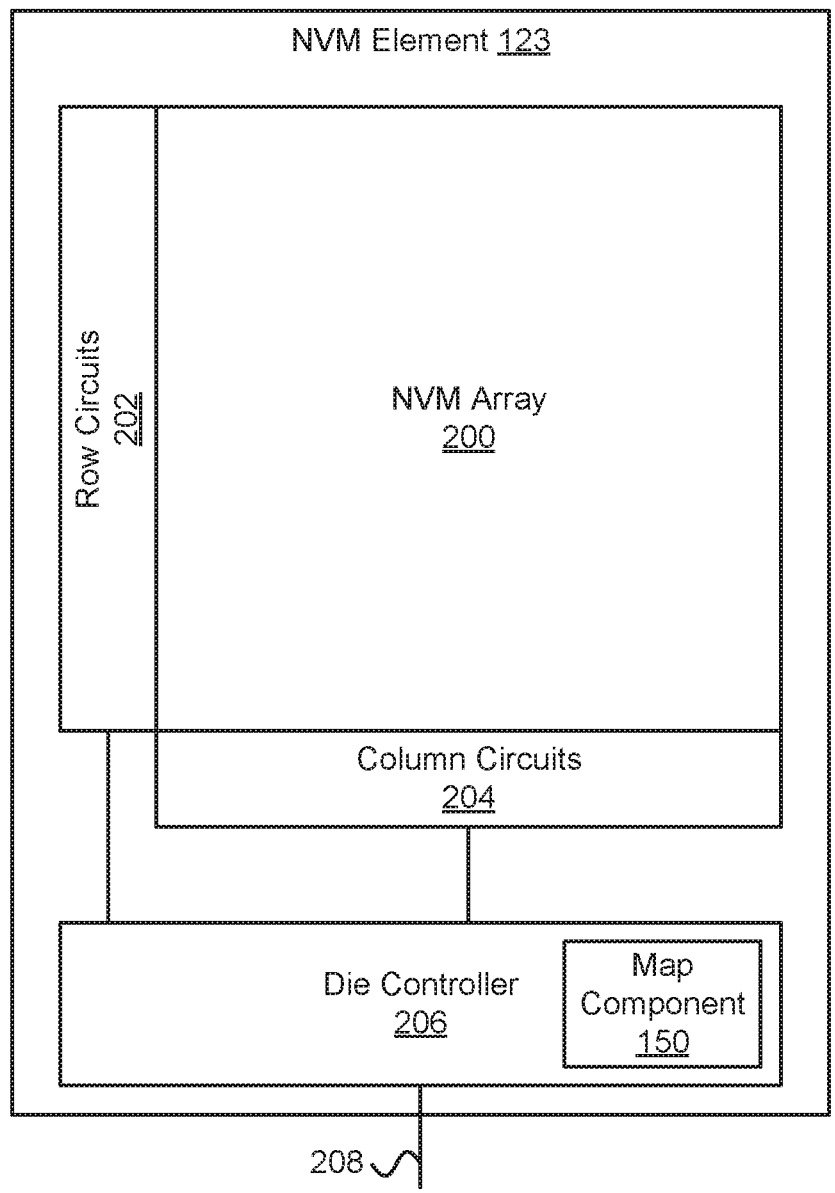
FIG. 2 is a schematic block diagram illustrating one embodiment of a non-volatile memory element.

FIG. 2 depicts one embodiment of a non-volatile memory element 123. The non-volatile memory element 123 may be substantially similar to the non-volatile memory element 123 described with reference to FIG. 1. The non-volatile memory element 123, in the depicted embodiment, includes an array 200 of non-volatile memory cells, row circuits 202, column circuits 204, and a die controller 206.

In various embodiments, a non-volatile memory element 123 may be an integrated circuit that includes both a core array 200 of memory cells for data storage, and peripheral components (e.g., row circuits 202, column circuits 204, and/or die controller 206) for communicating with the array 200. In certain embodiments, one or more non-volatile memory elements 123 may be included in a memory module, a storage device, or the like.

In the depicted embodiment, the array 200 includes a plurality of non-volatile memory cells for storing data. In one embodiment, the array 200 may be a two-dimensional array. In another embodiment, the array 200 may be a three-dimensional array that includes multiple planes and/or layers of non-volatile memory cells. In various embodiments, the array 200 may be addressable by rows via row circuits 202, and by columns via column circuits 204.

The die controller 206, in certain embodiments, cooperates with the row circuits 202 and the column circuits 204 to perform memory operations on the array 200. In various embodiments, the die controller 206 may include components such as a power control circuit that controls the power and voltages supplied to the row circuits 202 and column circuits 204 during memory operations, an address decoder or map component 150 that translates a received address to a hardware address used by the row circuits 202 and column circuits 204, a state machine that implements and controls the memory operations, and the like. The die controller 206 may communicate with a computing device 110, a processor 115, a bus controller, a storage device controller, a memory module controller, or the like, via line 208, to receive command and address information, transfer data, or the like.

In the depicted embodiment, the die controller 206 includes a map component 150, which may be substantially similar to the map components 150 described with reference to FIG. 1. In certain embodiments, the map component 150 may translate a received logical address to a hardware physical address used by the row circuits 202 and column circuits 204. In various embodiments, translating a logical address to a physical address may be done by a map component 150 of a die controller 206 for a non-volatile memory element 123, and/or may be done by a map component 150 of a device driver or device controller 126 for a non-volatile memory device 120 (e.g., where a physical address may refer to a location on a single non-volatile memory element 123, or to a stripe of locations on multiple non-volatile memory elements 123). In another embodiment, a map component 150 may include portions of a device driver, a device controller 126, one or more die controllers 206, and/or the like.

FIG. 3 depicts one embodiment of a translation table 300*a*. In various embodiments, a map component 150 may maintain a logical-to-physical mapping for converting logical addresses to physical addresses, where the logical-to-physical mapping includes a translation table 300*a*. In the depicted embodiment, the translation table 300*a* associates groups 302 of logical addresses with groups 304 of physical addresses. Additionally, in the depicted embodiment, mathematical mappings 306 for the groups 302, 304 associate individual logical addresses with individual physical addresses.

In general, in various embodiments, an "address," whether logical or physical, may be an identifier such as a number, a set of bits, a tuple, or the like, that identifies a location where data is, or may be, stored (e.g., a byte, page, or block of the array 200). For example, an address may be a logical block address that identifies a block of data storage, a cylinder/head/sector tuple that identifies a data location for a hard drive, a byte address that identifies a byte of memory, or the like. An address and a location identified by the address may be referred to interchangeably herein. For example, a memory operation such as a read or write operation may be said to be performed "at" an address, when data is read from or written to the location that the address refers to. In various embodiments, non-volatile memory elements 123 may be addressable at various granularities. For example, in one embodiment, a non-volatile memory element 123 for a storage device may be block addressable, so that an address identifies or refers to a block of multiple bytes similar to a hard drive sector (e.g., a 512 B block, a 2 KiB block, a 4 KiB block, an 8 KiB block, a 16 KiB block, or the like). In another embodiment, an address may refer to a stripe of locations across multiple non-volatile memory elements 123. In another embodiment, a non-volatile memory element 123 for storage class memory may be byte addressable, so that an address identifies or refers to a single byte of memory. In certain embodiments, a non-volatile memory device 120 may be addressable at multiple granularities. For example, a non-volatile memory device 120 may provide block-level and byte-level interfaces for addressing and accessing data. In another embodiment, non-volatile memory elements 123 may be addressable at the level of a memory cache (e.g., a 32 B cache line, a 64 B cache line, a 128 B cache line, or the like), and an address may identify or refer to a cache line. Various further types of addresses that may be used, in various embodiments, will be clear in view of this disclosure A "physical address," in various embodiments, may be any address that refers to a fixed physical location where data is, or may be, stored. Thus, repeated memory operations for a physical address will repeatedly access the same physical location. For example, a physical address may refer to a physical region of an array 200, to a stripe of physical locations across multiple non-volatile memory elements 123, or the like. In further embodiments, a "logical address" may be an address that does not refer to a fixed physical location. Instead, in certain embodiments, a logical address may be mappable to indicate, point to, or reference different physical addresses or locations. For example, a logical address may be mapped to correspond to a physical address or location, but may also be remapped to correspond to a different physical address or location. In certain embodiments, logical addresses may be used in an external interface for a non-volatile memory element 123 or a non-volatile memory device 120, and physical addresses may be used internally. For example, a storage client 116 may write data over an interface, indicating a logical address for writing the data, and a device controller 126 and/or die controller 206 may convert the logical address to a physical address for writing the data.

A logical-to-physical mapping, in various embodiments, may include any function, operation, data structure, or the like that associates logical addresses with physical addresses. A controller such as a device controller 126 or die controller 206 may maintain a logical-to-physical mapping by storing information used to convert a logical address to a physical address, such as a data structure that associates logical addresses with physical addresses, parameters or a definition for a mathematical function that converts logical addresses to physical addresses, or the like. Logical-to-physical mapping information may be stored in volatile memory, in a known physical location on the non-volatile memory, or the like. Various types of logical-to-physical mapping information and ways to store and maintain a logical-to-physical mapping will be clear in view of this disclosure.

In certain embodiments, a controller that maintains a logical-to-physical mapping may use the logical-to-physical mapping to convert logical addresses to physical addresses to perform data operations, such as read, write, program, or erase operations. For example, in one embodiment, a client 116 may request a data operation by issuing a command or request that indicates a logical address, such as a request or command that includes a logical address, a range of logical addresses, an offset from a starting logical address, or the like. In a further embodiment, the device controller 126 and/or die controller 206 may receive the request, use a logical-to-physical mapping to convert the logical address to a physical address, and may then perform the requested memory operation at the physical address.

In the depicted embodiment, a logical-to-physical mapping maintained by a map component 150 includes a translation table 300a that maps groups 302 of logical addresses to groups 304 of physical addresses. A group 302 of logical addresses may be any set or collection of logical addresses. Similarly, a group 304 of physical addresses may be any set or collection of physical addresses. In certain embodiments, a group 302, 304 of addresses may be a range of contiguous addresses. For example, Group 1 may include logical addresses 0-1024; Group 2 may include logical addresses 1024-2047, and so on. In another embodiment, a group 302, 304 of addresses may include noncontiguous addresses. In various embodiments, groups 302, 304 may be uniformly sized or may be of various sizes, and the group size, number of groups, or the like may vary based on how the translation table 300a is configured, or on how groups are split, merged, updated, or the like.

In certain embodiments, groups 302, 304 may be predefined, or configured with a fixed definition. For example, a group 302 of logical addresses may be defined so that logical addresses with the same most significant byte (or least significant byte, or another portion of a logical address) are in the same group. In another embodiment, groups 302, 304 may be flexibly defined by the map component 150, allowing the map component 150 to merge, split or otherwise adjust the size or composition of different groups 302. In certain embodiments, a map component 150 may maintain information such as metadata indicating or defining which logical addresses are in which groups 302, and which physical addresses are in which groups 304. For example, the translation table 300a may include group definition metadata (not shown). Alternatively, metadata that defines groups 302, 304 may be stored separately from the translation table 300a. Metadata that defines groups 302, 304 may include information identifying which addresses are in which groups 302, 304, such as a range of addresses that defines a group 302, 304, a starting address and group size for the group 302, 304, a portion of an address that corresponds to what group 302, 304 the address is in, or the like. Various further types of metadata for defining groups 302, 304 will be clear in view of this disclosure.

A translation table 300a, in various embodiments, may be any data structure that associates groups 302 of logical addresses (or individual logical addresses) with corresponding groups 304 of physical addresses (or individual physical addresses). In a further embodiment, the map component 150 may use the association between groups 302, 304 to determine which group 304 of physical addresses corresponds to a group 302 of logical addresses. Thus, in certain embodiments, a translation table 300a may be indexed or ordered by logical address group 302. The term "table" is used to suggest the association between groups 302, 304, and is not intended as limiting. For example, in the depicted embodiment, the translation table 300a is a literal table or two-dimensional array, where a logical address group 302 in a row of the table corresponds to a physical address group 304 in the next column of the same row. In another embodiment, however, a translation table 300a may be another associative data structure such as a hash table with logical address groups 302 as keys and physical address groups 304 as values, a tree data structure where nodes are logical address group 302 and physical address group 304 pairs, or the like.

In a further embodiment, a logical-to-physical mapping maintained by a map component 150 may include one or more mathematical mappings 306. In certain embodiments, a mathematical mapping 306 for a group 302 of logical addresses may associate individual logical addresses within the group 302 of logical addresses with individual physical addresses within a corresponding group 304 of physical addresses.

Where a group 302 of logical addresses is given, known, or determined (e.g., based on a requested logical address), a "corresponding" group 304 of physical addresses may be the physical address group 304 that corresponds to or is associated with the logical address group 302 in the translation table 300a. For example, in FIG. 3, the physical address group 304 identified by the number 7 corresponds to the logical address group 302 identified by the group 1. In a further embodiment, a controller that receives a request for a data operation, where the request indicates a logical address, may convert the logical address to a physical address by identifying which logical address group 302 the requested logical address is in, using the translation table 300a to identify which physical address group 304 corresponds to that logical address group 302, and using a mathematical mapping 306 to identify a physical address 306 within the physical address group 304.

A mathematical mapping 306, in various embodiments, may be a mathematical function that associates a physical address with a logical address by returning a physical address, a portion of a physical address, an offset from a starting physical address for a group 304, or the like, as a function of a logical address, a portion of a logical address, an offset from a starting logical address for a group 302, or the like. Although the mathematical definition of a function is broad enough to encompass an any-to-any mapping such as a set of ordered pairs where each input point is paired with one output point (e.g., a lookup table for individual addresses), terms such as "mathematical mapping," "function," or the like, are used herein to refer to relations that can be described by one or more formulas, expressions, or algorithmic steps other than lookups of potentially arbitrary or any-to-any associations. For example, using a mathematical mapping to determine a physical address from a logical address may involve separating the logical address into portions, reordering bytes of the logical address, performing arithmetical operations, bitwise logical operations, or the like, using one or more portions of the logical address. Various types of mathematical operations that may be performed, starting from a logical address, to transform the logical address to a physical address, will be clear in view of this disclosure.

In the depicted embodiment, the mathematical mappings 306 include a set of functions $f_1$-$f_N$ corresponding to logical address groups 302 numbered 1 through N, so that $f_1$ maps logical addresses in group 1 to physical addresses in a corresponding group, $f_2$ maps logical addresses in group 2 to physical addresses in a corresponding group, and so on. In one embodiment, the map component 150 may define or store a mathematical mapping 306 for each logical address group 302, for each physical address group 304, or the like. For example, the map component 150 may store function definitions for mathematical mappings 306 with the translation table 300a, or separately from the translation table 300a. In another embodiment, the map component 150 may be preconfigured to use a mathematical mapping 306 with one or more variable parameters, for multiple groups, and may store parameters for the different logical address groups 302, or physical address groups 304. For example, in one embodiment, the mathematic mappings 306 for multiple groups may be based on a bitwise exclusive or (XOR) function, so that at least a portion of a physical address is obtained by computing the XOR of a bitmask and at least a portion of a logical address. In a further embodiment, the map component 150 may store bitmasks for the different logical address groups 302, or physical address groups 304, as parameters to be used with the XOR function.

In various embodiments, the map component 150 may map logical addresses to physical addresses using the translation table 300a and the mathematical mappings 306. For example, in the depicted embodiment, the map component 150 may receive a request to read or write data at a logical address, and may determine a logical address group 302 to which the logical address belongs. The map component 150 may then use the translation table 300a to determine a corresponding physical address group 304. For example, in the depicted embodiment, if the received logical address is in logical address group 2, the translation table indicates that the corresponding physical address will be in physical address group 1. The map component 150 may then use the function $f_2$ as a mathematical mapping 306 for logical addresses in group 2, by applying the function $f_2$ to the logical address to return a physical address (in physical address group 1). A controller such as a device controller 126 or die controller 206 may then perform the read or write operation at the physical address (e.g., at the physical location identified by the physical address).

In certain embodiments, using a translation table 300a to associate logical address groups 302 with physical address groups 304 may provide flexible or any-to-any mapping that facilitates flexible wear leveling without using large amounts of memory. In further embodiments, using mathematical mappings 306 to associate logical addresses within a logical address group 302 to physical addresses within a physical address group 304 may provide fast and/or low-memory mapping by storing a function or parameters rather than a large associative data structure. For example, in certain embodiments, using a large associative data structure stored in volatile memory may involve several steps just to access the volatile memory, while using a mathematical mapping 306 may involve performing a small number of operations, implemented in a small area of the controller or with a small gate count, to convert a logical address to a physical address. In further embodiments, using mathematical mappings 306 may facilitate design of fast and simple hardware implementations for the controller.

FIG. 4 depicts another embodiment of a translation table 300b. In certain embodiments, the translation table 300b may be substantially similar to the translation table 300a described above with reference to FIG. 3, and may associate logical address groups 302 with physical address groups 304, substantially as described above. In further embodiments, the translation table 300b may store mathematical mappings 306 for the groups 302, 304 that associate individual logical addresses with individual physical addresses, substantially as described above.

In certain embodiments, a controller such a device controller 126 or a die controller 206 may change at least one of the mathematical mappings 306 that associate individual logical addresses with individual physical addresses. In the depicted embodiment, the translation table 300b of FIG. 4 includes a changed mathematical mapping 306 compared to the translation table 300a of FIG. 3. Specifically, in the depicted embodiment, the mathematical mapping 306 for the second logical address group 302 is changed from a first function $f_2$ to a second function $g_2$. In the depicted embodiment, only the mathematical mapping 306 for the second logical address group 302 is changed, from the first function $f_2$ to a second function $g_2$, while the mathematical mappings such as $f_1$ and $f_N$ for other logical address groups 302 are unchanged. In another embodiment, the controller may change mathematical mappings 306 for multiple logical address groups 302, such as by changing functions $f_1$-$f_N$ to new functions $g_1$-$g_N$. In various embodiments, the controller may change mathematical mappings 306 one group at a time, in a predefined order or based on wear, or may change mathematical mappings 306 together for some or all of the logical address groups 302.

In various embodiments, changing a mathematical mapping 306 may include changing a function that maps logical addresses to physical addresses, changing a parameter for a mapping function, changing a bitmask for an XOR-based mapping, or the like. For example, in various embodiments, changing a mathematical mapping 306 may include changing a bitmask for an XOR-based mapping, or another parameter for a mapping function, to a random value, to a pseudo-random value determined based on a seed, to a subsequent value in a mathematical sequence (e.g., binary order, Gray code order, or any other mathematical sequence), randomly identifying a bit (or bits) to change in the bitmask (or other parameter), or the like. In further embodiments, changing a mathematical mapping 306 may include storing the new mapping, function, parameter, or the like. Various ways of changing or updating a mathematical mapping will be clear in view of this disclosure.

In the depicted embodiment, the changed mapping $g_2$ may map logical addresses in the second logical address group 302 to different physical addresses in the first physical address group 304 than the previous mapping $f_2$. For example, the previous mapping $f_2$ may have mapped a first logical address in the second logical address group 302 to a physical address in the first physical address group 304, where data for that logical address may be stored, and the changed mapping $g_2$ may now map the same logical address to a new physical address in the first physical address group 304. Accordingly, in certain embodiments, a controller such a device controller 126 or a die controller 206 may move data based on a changed mathematical mapping 306. For example, the controller may move data from old physical locations or addresses to new physical locations or addresses, for logical addresses in a logical address group 302 with a changed mathematical mapping 306. In various embodiments, moving data may include reading data from an old location and writing data to a new location, swapping data between locations, writing data to a temporary location or cache during a move operation, or the like. Various ways to move data based on a changed mathematical mapping 306 will be clear in view of this disclosure.

In certain embodiments, changing a mathematical mapping 306 and moving data based on the changed mathematical mapping 306 may provide wear leveling for a non-volatile memory element 123 or a non-volatile memory device 120. For example, in one embodiment, changing a mathematical mapping 306 may remap a logical address that is a frequent target for write operations to a new physical address, so that a single physical location is not over-worn by repeated writes to the same logical address.

However, moving data for the logical addresses in a group to new physical locations may itself cause wear on a non-volatile memory element 123 or a non-volatile memory device 120. For example, in one embodiment, if the translation table 300b maps a group of 1024 logical addresses to a group of 1024 physical addresses, and if the controller changes a mathematical mapping 306 that associates individual logical addresses with individual physical addresses, then moving the data based on the changed mathematical mapping 306 may include moving up to 1024 data units (e.g., bytes, pages, or blocks, or the like, depending on the granularity of the addressing) from old locations to new locations.

In certain embodiments, wear due to moving data based on a changed mathematical mapping 306 may be reduced or limited by moving data in a series of small moves, with delays between the small moves. However, moving data for one logical address to a new physical location may depend on moving data that already exists at the new physical location, such as data for another logical address, to another new physical location for that data, or to some intermediate storage location such as a cache or buffer. For example, moving data from a first physical address to a second physical address may overwrite the data at the second physical address, unless the data at the second physical address is first preserved by moving that data to its new location, or to an intermediate location. If the new location for that data is a third physical address, then the same problem arises unless the data at the third physical address is first preserved by moving that data to its new location, or to an intermediate location. Thus, in certain embodiments, moving data in a series of small moves with delays between the small moves may involve maintaining data in an intermediate cache or buffer between moves, which may complicate data access in the delay period between moves, and which may risk data loss if the intermediate cache or buffer is volatile.

However, in another embodiment, if the new location for the data at the second physical address is back at the first physical address, then data may be swapped between the first and second physical addresses, leaving both data values in locations where they can be accessed using the new mathematical mapping 306. Additionally, because both data values are in their intended physical locations, losing either data value from a more temporary cache or buffer does not result in actual data loss. Thus, in certain embodiments, a controller may change a mathematical mapping 306 in such a way that data can be moved in a series of swaps, which are capable of being performed without the use of intermediate data storage between swaps. Data swaps and delays between swaps are described in further detail below with regard to FIGS. 7-11.

Figure 5:
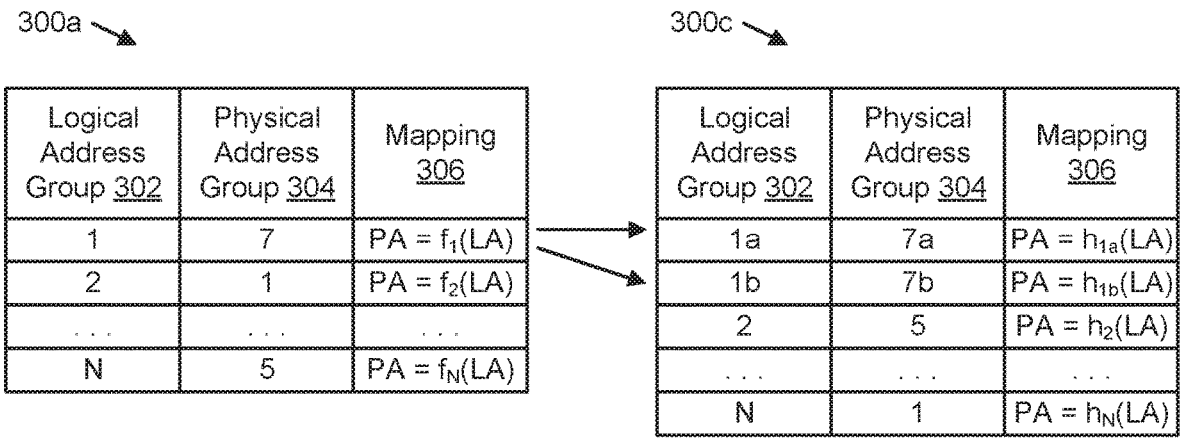
FIG. 5 is a schematic block diagram illustrating a table update and a group split for a translation table.
Figure 6:
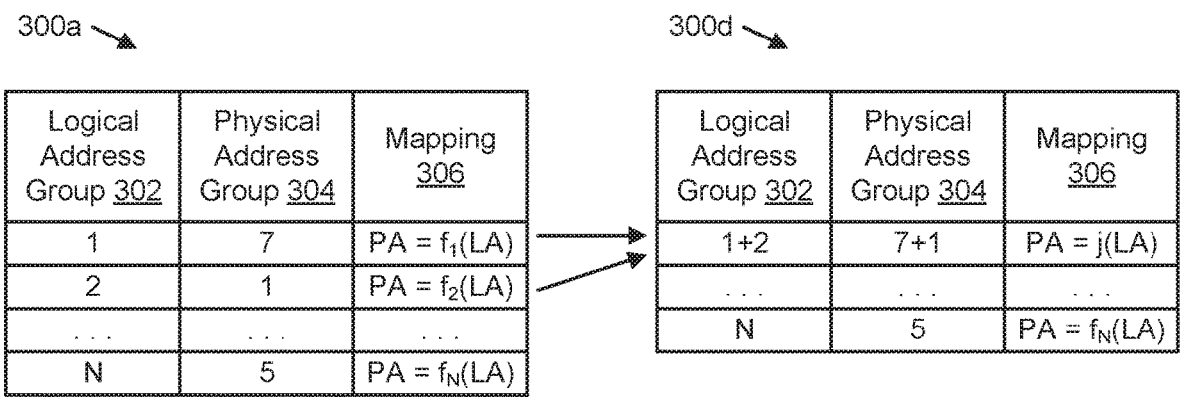
FIG. 6 is a schematic block diagram illustrating a group merge for a translation table.

FIG. 5 and FIG. 6 depict updates to a translation table 300 for updating, splitting, or merging logical address groups. Translation tables 300c and 300d, in the depicted embodiment, are substantially similar to the translation table 300a of FIG. 3, which is depicted as a start point for the split or merge.

In various embodiments, a controller may level wear on physical locations by changing a mathematical mapping 306, and/or by updating the translation table 300 to change the association between logical address groups 302 and physical address groups 304. In one embodiment, the controller may change a mathematical mapping 306 for a logical address group 302 to level wear within a corresponding physical address group 304. In another embodiment, a controller may level wear among groups by updating a translation table to remap one or more logical address groups 302 to different physical address groups 304. For example, in FIG. 5, translation table 300a shows that logical addresses in group 2 are mapped to physical addresses in group 1, while, logical addresses in group N are mapped to physical addresses in group 5. The controller may update the translation table 300a to translation table 300c, re-associating logical address group 2 with physical address group 5, and logical address group N with physical address group 1. The controller may then use the initial mathematical mappings $f_2$ and $f_N$ for logical address groups 2 and N, or may use updated mappings $h_2$ and $h_N$ for logical address groups 2 and N, as depicted in FIG. 5, and may move data between groups.

In certain embodiments, moving data based on a changed mathematical mapping 306 may provide wear-leveling within a group of physical addresses, and moving data based on a changed translation table 300 may provide wear-leveling between groups. For example, if one logical address in a group is frequently written to, changing the mathematical mapping 306 for the group may remap that logical address to a fresh physical address to avoid over-wearing a single physical location. In a further embodiment, if multiple logical addresses in a group are frequently written to, the logical address group 302 may be remapped to a new physical address group 304 with less wear by updating the translation table. Thus, in certain embodiments, the translation table 300 may provide flexible any-to-any mapping between logical address groups 302 and physical address groups 304, facilitating flexible wear leveling. In further embodiments, the mathematical mappings 306 may provide mapping and wear-leveling with low memory or metadata overhead, at the expense of some flexibility. For example, changing mathematical mappings may be less flexible than using arbitrary mappings, if changing a function parameter to map a frequently written-to logical address to a fresh physical address incidentally remaps other somewhat frequently written-to logical addresses to more worn physical addresses. Thus, in certain embodiments, using a flexible translation table 300 with any-to-any mappings between groups, but with low-overhead mathematical mappings 306 for individual addresses within groups, may provide mapping and wear leveling with both flexibility and low overhead.

In one embodiment, the controller may split a logical address group 302 into two groups, by updating the translation table 300. For example, in FIG. 5, the controller has updated translation table 300a to translation table 300c so that logical address group 1 is divided into logical address groups 1a and 1b. In various embodiments, splitting or dividing a group may include determining a boundary between two new or split groups, recording metadata indicating which addresses are in which of the split or new groups, adding a row to the translation table for a new group, or the like.

In a further embodiment, the controller splits the corresponding physical address group 304 into two groups, by updating the translation table 300. For example, the controller may divide the physical address group 7 corresponding to logical address group 1, into physical address groups 7a and 7b. In the updated translation table 300c, logical address group 1a now corresponds to physical address group 7a, and logical address group 1b now corresponds to physical address group 7b. However, the old mathematical mapping $f_1$ for logical address group 1 may map some of the logical addresses in group 1a into physical address group 7b. Thus, in the depicted embodiment, the controller may select new mathematical mappings $h_{1a}$ and $h_{1b}$ for logical addresses in the newly split logical address groups 1a and 1b, respectively, to map logical addresses in group 1a into physical address group 7a and logical addresses in group 1b into physical address group 7b. The controller may move data based on the new mathematical mappings for the split groups.

In another embodiment, the controller may maintain the existing mathematical mapping $f_1$ for both logical address groups 1a and 1b, but may define the new physical address groups 7a and 7b so that the physical addresses in group 7a correspond to the logical addresses in group 1a. Maintaining the existing mathematical mapping 306 for a split group may avoid moving data, but may increase metadata used to record which addresses belong to which groups. After a group split, the controller may update mathematical mappings 306 independently for the newly split groups. Thus, splitting a group may provide finer-granularity, more flexible wear leveling. For example, in one embodiment, changing a mathematical mapping 306 for a logical address group 302 may result in moving all the data in a corresponding physical address group 304. Splitting the groups 302, 304 may provide greater flexibility for remapping frequently written-to addresses to lightly-worn locations, or lightly-used addresses to heavily-worn locations in one split group, without moving data in the other split group.

Conversely, in another embodiment, the controller may merge two logical address groups 302 into one group, by updating the translation table 300. For example, in FIG. 6, the controller has updated translation table 300a to translation table 300d so that logical address groups 1 and 2 are merged into a new logical address group, depicted as logical address group 1+2. In various embodiments, merging two groups may include recording a new definition for the merged group, recording metadata indicating which addresses are in the merged group, replacing two rows of the translation table with one row for the merged group, or the like.

In a further embodiment, the controller merges the corresponding physical address groups 304 into one group, by updating the translation table 300. For example, the controller may merge physical address groups 7 and 1, corresponding to logical address groups 1 and 2, into a new physical address group, depicted as physical address group 7+1. In the updated translation table 300d, logical address group 1+2 now corresponds to physical address group 7+1. However, the old mathematical mappings $f_1$ and $f_2$ for logical address groups 1 and 2 may be two different mappings. Thus, in the depicted embodiment, the controller may select or determine a new mathematical mapping j to map logical addresses in the merged logical address group 1+2 to physical addresses in the merged physical address group 7+1. The controller may move data based on the new mathematical mapping for the merged group.

In another embodiment, the controller may set mathematical mappings to be identical for two logical address groups that are to be merged, and may move data based on the new mappings, prior to merging the groups. In a further embodiment, the controller may then maintain that new mapping for the merged group. In various embodiments, merging groups may improve wear leveling. For example, in one embodiment, one logical address group 302 may include addresses that are frequently written to, and another logical address group 302 may include addresses that are infrequently written to. In a further embodiment, merging two such groups 302, and the corresponding physical address groups 304, may allow frequently written-to logical addresses to be remapped to infrequently-used physical locations, by changing the mathematical mapping 306 for the merged group.

Figure 7:
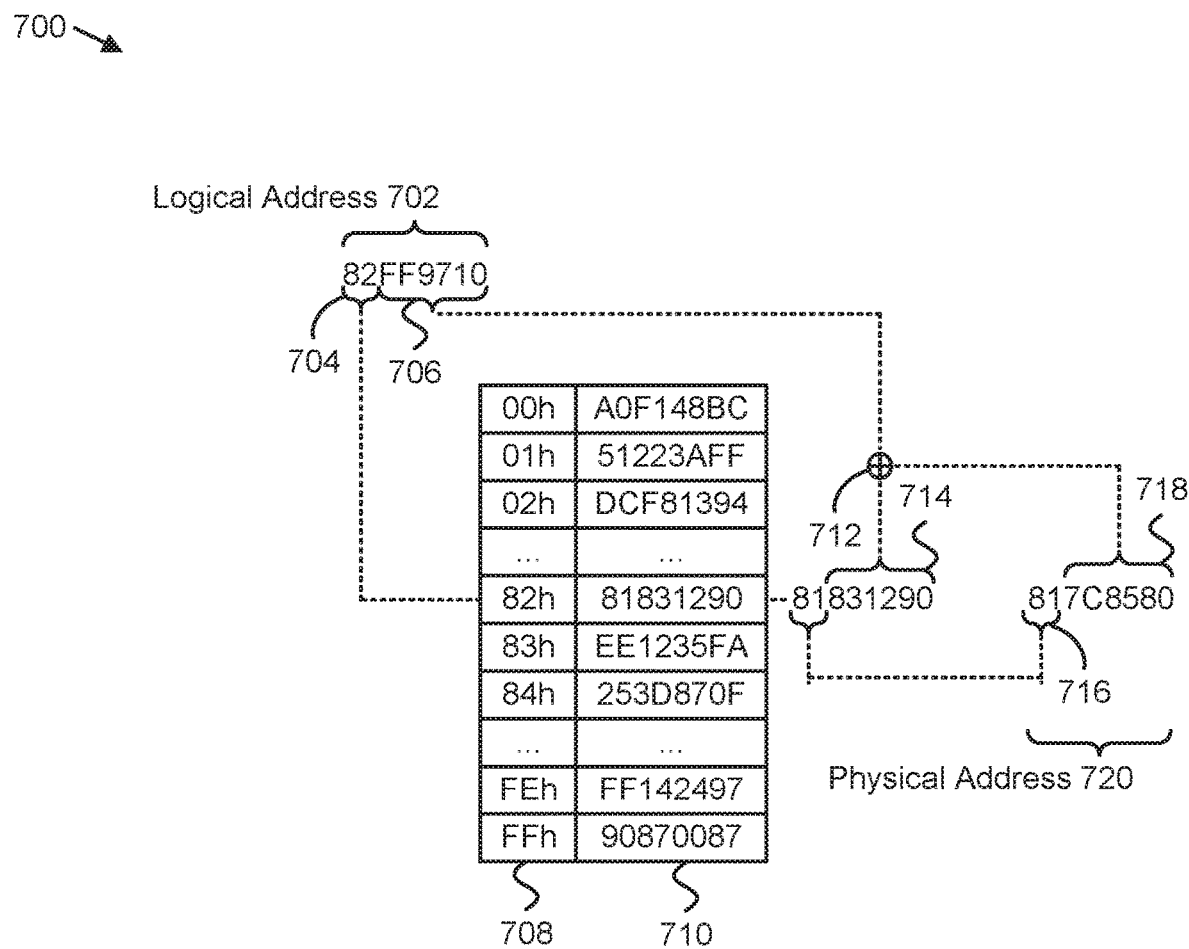
FIG. 7 is a schematic block diagram illustrating another embodiment of a translation table.

FIG. 7 depicts another embodiment of a translation table 700. The translation table 700, in certain embodiments, may associate groups of logical addresses 702 with physical addresses 720. In the depicted embodiment, a logical address 702 includes a first portion 704 and a second portion 706. In a further embodiment, the first portion 704 of the logical address 702 corresponds to or identifies a group of logical addresses 702, and the second portion 706 of the logical address 702 is used in conjunction with a mathematical mapping, such as a placement map, XOR map, or XOR mask, to determine a physical address 720.

In the depicted embodiment, the first portion 704 of a logical address 702 comprises the first byte of the logical address 702 (e.g., two hex digits), and the second portion 706 comprises the remaining bytes of the logical address 702. However, the terms "first" and "second" are used for convenience in referring to the two portions 704, 706 of the logical address 702, and not to imply a particular order. Thus, the first portion 704 may be one or more bits at the start of the logical address 702, one or more bits at the end of the logical address 702, one or more bits within the logical address 702, a contiguous or non-contiguous set of bits from the logical address 702, a set of bits that does or does not align with byte boundaries of the logical address 702, or the like. The second portion 706 may be the remaining bits of the logical address 702. Conversely, the second portion 706 may be a defined set of bits or bytes of the logical address 702, and the first portion 704 may be the remaining bits.

In the depicted embodiment, logical addresses 702 are four bytes or thirty-two bits, providing a logical address space of $2^{32}$ possible addresses. Four-byte logical addresses 702 and physical addresses 720 are depicted for illustrative purposes; in another embodiment, a logical address 702 or a physical address 720 may include more or fewer bytes, corresponding to a larger or smaller address space. In the depicted embodiment, the first portion 704 corresponds to a group, and dividing the logical addresses 702 into portions such that the first portion 704 is one byte provides 256 logical address groups, corresponding to 256 possible values for an eight-bit byte. The remaining three bytes or twenty-four bits forming the second portion 706 correspond to $2^{24}$ logical addresses within a logical address group. In another embodiment, dividing logical addresses differently, with larger first portions 704 and smaller second portions 706 may provide a larger number of groups, with fewer logical addresses 702 per group. Conversely, dividing logical addresses differently, with smaller first portions 704 and larger second portions 706 may provide a smaller number of groups, with more logical addresses 702 per group.

In the depicted embodiment, a row of the translation table provides mapping information for a logical address group. The first column 708 of the translation table 700 includes logical address group identifiers, corresponding to the first portions 704 of logical addresses 702. Thus, a controller determining which physical address 720 corresponds to a logical address 702 may look up the first portion 704 of the logical address 702 in the first column 708 of the translation table 700, to find the row for a group. Although the translation table 700 is depicted as a table, it may be another associative data structure such as a hash table, a tree using the first portion 704 of the logical address 702 as a logical address group identifier or key to look up a value in the data structure, or the like.

In the depicted embodiment, the second column 710 of the translation table 700 includes values that associate a logical address group with a physical address group, and that identify an XOR mask for mapping addresses in the logical address group into the corresponding physical address group. In one embodiment, a single entry or value in a translation table 700 may include group information that identifies a physical address group and mapping information for mapping individual addresses between groups. In another embodiment, group information and mapping information may be divided between multiple entries or values. For example, in another embodiment, the column 710 may be divided into two columns that store group information and mapping information separately.

FIG. 7 illustrates using the translation table 700 to determine that the depicted logical address 702 is mapped to the depicted physical address 720. In the depicted embodiment, the first portion 704 of the logical address 702 is the hex value 82h. Looking up 82h in the first column 708 of the translation table 700, as the identifier for a logical address group, returns hex value 81831290h from the second column 710 of the translation table. The value from the second column 710, in certain embodiments, may be divided into a first portion 716 and a second portion 714 along similar lines as the logical address 702. The first portion 716, with the value 81h, acts as the first portion of the physical address 720, indicating that logical addresses 702 in the group 82h correspond to physical addresses 720 in the group 81h, or that logical addresses 702 beginning with the byte 82h correspond to physical addresses 720 beginning with the byte 81h in the depicted embodiment.

In a further embodiment, the second portion 714 may be used as an XOR map to determine a second portion 718 of the physical address 720 based on the second portion 706 of the logical address 702. In various embodiments, an XOR map, XOR mask, or placement map may refer to a bitmask that is XORed, bitwise, with at least a portion of a logical address 702 to determine at least a portion of a physical address 720. For example, in the depicted embodiment, the controller may use XOR hardware 712, such as a set of one or more XOR gates, a microprocessor configured to perform XOR operations, or the like, to XOR the second portion 706, with the XOR map 714, to obtain the second portion 718 of the physical address 720. For example, in the depicted embodiment, the second portion 706 of the logical address 702 has the hex value FF9710h, and the XOR mask 714 has the hex value 831290h, so the XOR hardware 712 returns the hex value 7C8580h as the second portion 718 of the physical address 720.

The controller may concatenate or otherwise merge the first portion 716 of the physical address 720 and the second portion 718 of the physical address 720 to obtain the full physical address 720 corresponding to the logical address 702. For example, in the depicted embodiment, the controller may concatenate the value 81h of the first portion 716 of the physical address 720 with the value 7C8580h of the second portion 718 of the physical address 720, to obtain the full physical address 720 with a value of 817C8580h.

The controller may use the process described above to determine a physical address 720 based on a logical address 702 in order to perform memory operations, such as read, write, program, or erase operations at physical locations, in response to requests that indicate logical addresses for the memory operations. Additionally, in various embodiments, a controller may change the XOR map 714 for a logical address group (e.g., by updating an entry in the second column 710 of the translation table 700), and may move data to new physical locations based on the changed XOR map 714, as described above with regard to changing a mathematical mapping 306.

In certain embodiments, defining a mathematical mapping 306 in terms of an XOR map 714, and changing the mapping 306 by changing the XOR map 714, may allow the controller to move the data in a series of swaps, which are capable of being performed without the use of intermediate data storage between swaps. Wear leveling by swapping data between pairs of physical addresses 720 based on a changed XOR map 714 is described in further detail below with regard to FIGS. 8 and 9.

Figure 8:
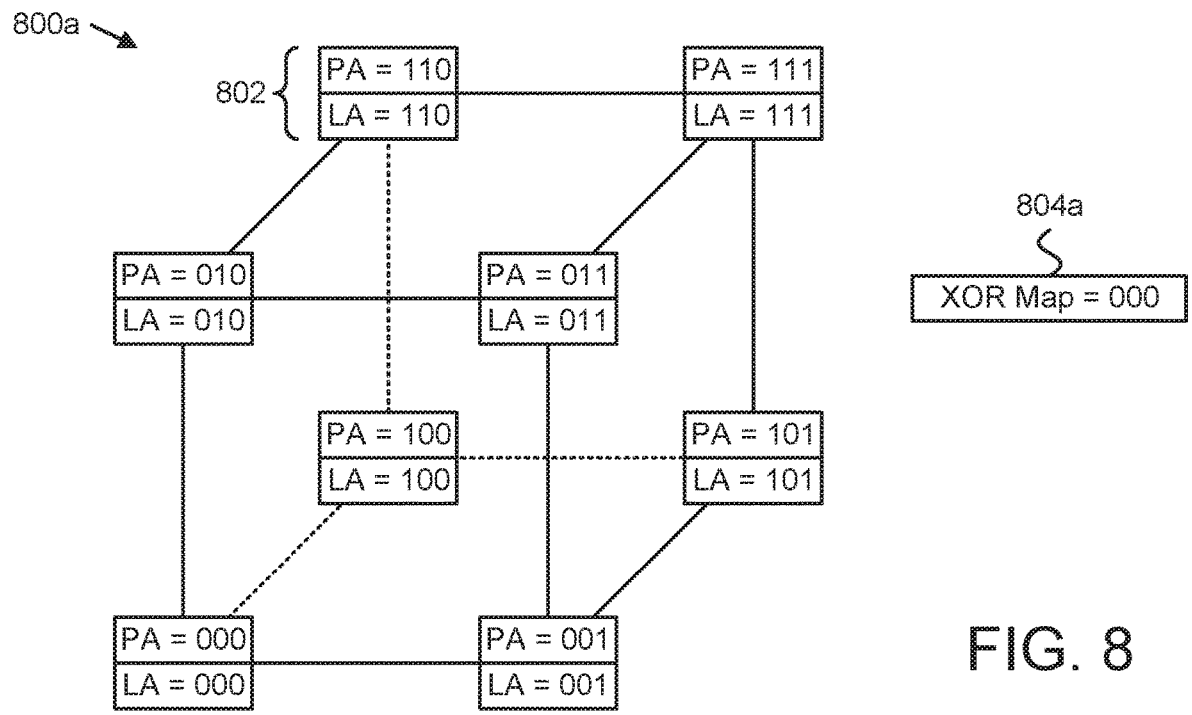
FIG. 8 is a schematic block diagram illustrating one embodiment of a mathematical mapping between logical and physical addresses.
Figure 9:
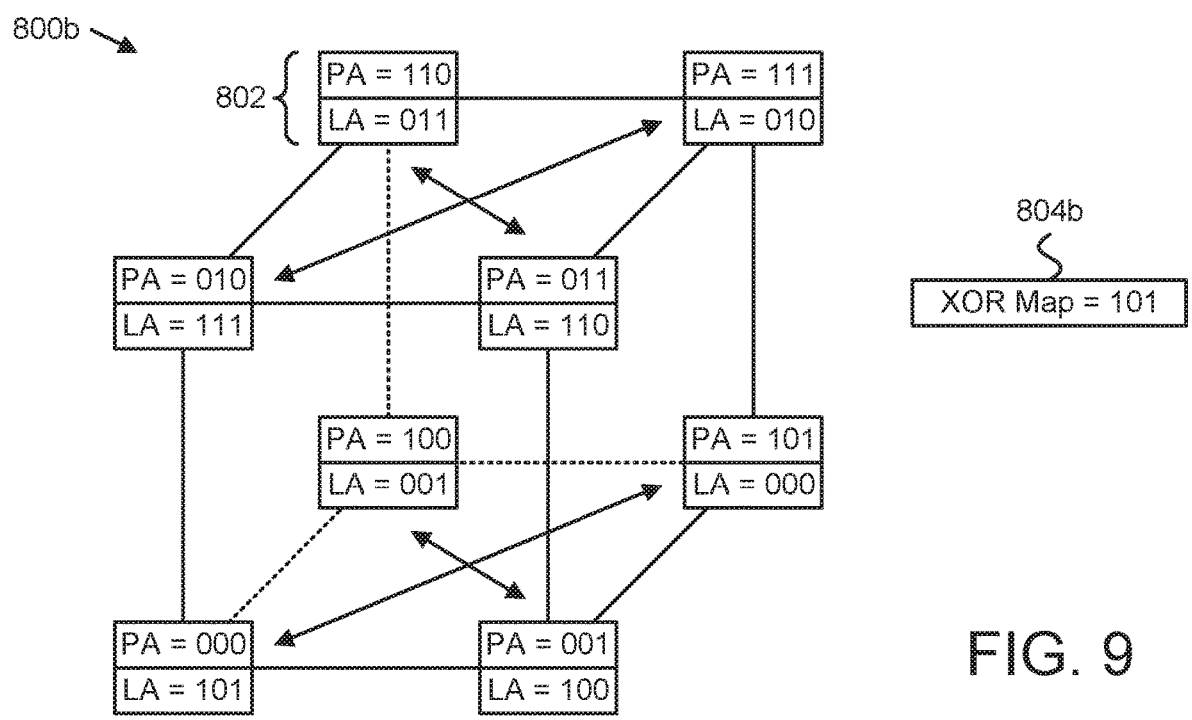
FIG. 9 is a schematic block diagram illustrating another embodiment of a mathematical mapping between logical and physical addresses.

FIGS. 8 and 9 depict two embodiments of mathematical mappings 800 between logical and physical addresses. In the depicted embodiment, the mathematical mappings 800 are based on XOR maps 804, which may be substantially similar to the XOR maps 714 described above with reference to FIG. 7. A simplified embodiment of a mapping between eight logical addresses and eight physical addresses, where each address is three bits, is depicted for illustrative purposes. However, in a further embodiment, a mathematical mapping 800 for a group of logical addresses may map more than eight logical addresses to more than eight physical addresses. Additionally, a mathematical mapping 800 may map a portion of a logical address to a portion of a physical address, where other portions (not depicted) of the logical and physical addresses correspond to logical address groups, and are associated via a translation table.

In the depicted embodiment the mappings 800 are depicted as cubes with eight vertices 802. A physical address is depicted at each vertex 802. In the depicted embodiment, eight three-bit physical addresses are depicted as conceptually equivalent to eight vertices 802 of a cube. More generally, in various embodiments, a set of n-bit addresses may be conceptually equivalent to, or visualized as vertices of an n-dimensional hypercube. For example, a set of one-bit addresses consisting of the bits "0" and "1" may be visualized at opposite ends of a line segment, or 1-dimensional hypercube. A set of two-bit addresses consisting of the bits "00," "01," "10," and "11" may be visualized at corners of a square, or 2-dimensional hypercube. A set of four-bit addresses from "0000" to "1111" may be visualized at the sixteen vertices of a four-dimensional hypercube, and so on. In the depicted embodiment, eight physical addresses from "000" to "111" are visualized as vertices of a three-dimensional hypercube: in other words, a cube.

In certain embodiments, each bit of a physical address may identify a half of a hypercube. For example, in the depicted embodiment, physical addresses with 0 as the first bit are in the front half of the hypercube, while physical addresses with 1 as the first bit are in the back half. Similarly, in the depicted embodiment, physical addresses with 0 as the second bit are in the top half of the hypercube, while physical addresses with 1 as the second bit are in the bottom half, and physical addresses with 0 as the third bit are in the left half of the hypercube, while physical addresses with 1 as the third bit are in the right half. In further embodiments, where physical addresses are equivalent to vertices of a hypercube, a mapping 800 may be a way of assigning logical addresses to the vertices, or to the physical addresses. Equivalently, or in another embodiment, vertices 802 may be equated to logical addresses, and a mapping 800 may be a way of assigning physical addresses to the vertices 802.

In the depicted embodiment, a mapping 800 associates a logical address to a physical address, or assigns a logical address to a physical address at a vertex 802 of the depicted cube. In the depicted embodiment, an XOR map 804 defines the mapping: a bitwise XOR of a logical address with the XOR map 804 returns the physical address corresponding to the logical address.

FIG. 8 depicts a mapping 800a before the controller changes the mapping 800a and moves the data for wear-leveling, and FIG. 9 depicts a changed mapping 800b. In various embodiments, a mapping 800a prior to a change may be any mapping 800a, defined by any value for an XOR map 804a. Computing a bitwise XOR of a logical address with an XOR map 804 flips bits of the logical address at bit positions where the XOR mask 804 has a "1," and leaves bits of the logical address unflipped at bit positions where the XOR map 804 has a zero. In the depicted embodiment, the mapping 800a prior to the change has an XOR map 804a of "000," and is therefore the identity mapping: no bits are flipped, so logical address "000" is mapped to physical address "000," logical address "001" is mapped to physical address "001," and so on, with each logical address being mapped to a physical address identical to the logical address.

In the embodiment depicted in FIG. 9, the controller has changed the mapping 800b by updating the XOR map 804b to "101." In another embodiment, a mapping 800b subsequent to a change may be any mapping 800b that differs from the prior mapping 800a, defined by any XOR map 804b that differs from the prior XOR map 804a. In the depicted embodiment, the mapping 800b after the change has an XOR map 804b of "101," and therefore the mapping 800b flips bits one and three of a logical address: logical address "000" is mapped to physical address "101," logical address "001" is mapped to physical address "100," and so on, with each logical address being mapped to a physical address that has bits one and three flipped relative to the logical address.

In various embodiments, a mathematical mapping 800 from logical addresses to physical addresses, that returns a physical address as the result of a bitwise XOR operation with a logical address and an XOR map 804, may be an involution. As used herein, the term "involution" may refer to a function that is its own inverse. For example, the XOR map 804 may define which bits to flip to translate a logical address to a physical address, and re-applying the mapping by flipping the same bits again may translate the physical address back to the same logical address. Thus, in certain embodiments, a mathematical mapping 800 that is an involution may serve as both a forward logical-to-physical mapping and a reverse physical-to-logical mapping, which may provide efficient forward and reverse mapping without using additional metadata for the reverse mapping.

In further embodiments, a controller may use a forward logical-to-physical mapping and/or a reverse physical-to-logical mapping to move data when a mapping is changed. For example, in one embodiment, the controller may move data based on a changed mapping by iterating through physical addresses. To identify a new physical location for the data at a first physical address, the controller may reverse the prior logical-to-physical mapping to recover the logical address associated with that data, and may then apply the new or changed logical-to-physical mapping to determine the new physical location or address for the data. In another embodiment, the controller may move data based on a changed mapping by iterating through logical addresses, which may be equivalent to iterating through physical addresses in an order based on the prior logical-to-physical mapping.

In certain embodiments, the controller may calculate or use a physical address translation function to move data based on a changed logical-to-physical mapping. A physical address translation function, in various embodiments, may be a function that returns a new physical address for data based on the old physical address. In certain embodiments, a physical address translation function may be a composition of functions: a reverse of the prior logical-to-physical mapping to recover the logical address associated with the data at the old physical address, followed by application of the changed logical-to-physical mapping to determine the new physical location or address for the data. In further embodiments, if the physical address translation function is an involution, then data will be swapped between physical addresses: data at physical address A is moved to physical address B and data at physical address B is moved back to physical address A, in a two-cycle (where A and B represent any pair of physical addresses). If a physical address translation function is not an involution (e.g., in an embodiment that includes mathematical mappings other than XOR-based mappings), data may be moved in longer cycles. For example, in a three-cycle, data at physical address A may be moved to physical address B, data at physical address B may be moved to physical address C, and data at physical address C may be moved to physical address A (where A, B, and C represent any triplet of addresses).

In certain embodiments, although moving data in a three-cycle or a longer cycle may be accomplished in a series of swaps, such swaps may result in data of a logical address being moved to a physical location that is neither the old physical location or the new physical location associated with the logical address, and the data may not be accessible using either the prior mathematical mapping or the new mathematical mapping. If data is stored in an intermediate location, the controller may use additional metadata to track intermediate locations for data. However, in another embodiment, the controller may be configured to change a mathematical mapping in such a way that the physical address translation function for moving data based on the changed mapping is an involution. In further embodiments, the controller may then move data based on the mapping by swapping data values between pairs of physical addresses, where each swap results in two data values being moved to their intended locations under the changed mapping. In certain embodiments, swapping two data values to their intended locations under the changed locations may avoid using additional metadata to track intermediate data locations.

In certain embodiments, the physical address translation function may be an involution if reversing the prior mathematical mapping, followed by applying the changed mathematical mapping, is equivalent to reversing the changed mapping, followed by applying the old mapping. For example, if the previous mathematical mapping and the changed mathematical mapping are both involutions, and if they commute (e.g., if they can both be applied in either order without changing the result), then the physical address translation function will be an involution, and the controller may move data based on a changed mapping by swapping pairs of data values from their locations under the old mapping to their locations under the new mapping.

In the depicted embodiment, the prior mathematical mapping 800a and the new mathematical mapping 800b are both bitwise XORs of the logical address, with different XOR maps 804a, 804b. Each mapping 800 is an involution, because the XOR map 804 may define which bits to flip to translate a logical address to a physical address, and re-applying the mapping by flipping the same bits again may translate the physical address back to the same logical address. Additionally, the mappings commute, because the result of flipping bits based on two XOR maps 804 in succession depends on the number of bit flips at each position, not on the order in which the XOR maps 804 were applied. Therefore, in the depicted embodiment, data values may be swapped in pairs to move data to new locations when the controller changes from the first mapping 800*a* to the second mapping 800*b*.

In FIG. 9, pair swaps for moving data values are represented by arrows. It may be seen that in the prior mapping 800*a* of FIG. 8, data for logical addresses 000 and 101 is stored at physical addresses 000 and 101, respectively. In the changed mapping 800*b* of FIG. 9, logical address 101 now maps to physical address 000, and logical address 000 now maps to physical address 101. Thus, the controller may move data for both logical addresses to new locations under the changed mapping by swapping data between physical addresses 000 and 101. Similarly, data is swapped between physical addresses 001 and 100, between physical addresses 010 and 111, and between physical addresses 011 and 110. The pair swaps in the depicted embodiment are a result of both the prior XOR map 804*a* and the changed XOR map 804*b*. In another embodiment, changing the XOR map 804 again may result in moving data differently but still in a series of pair swaps.

In various embodiments, changing a mathematical mapping 800 for a group of logical addresses may swap pairs of physical addresses associated with pairs of logical addresses. In various embodiments, swapping a pair of logical addresses associated with a pair of physical addresses may refer to changing the mapping 800 in such a way that, if one logical address is remapped from one physical address to another physical address, another logical address is remapped from the other physical address back to the first physical address. For example, using arbitrary alphabetical labels for two logical addresses and two physical addresses, without implying that the logical addresses or the physical addresses are or are not adjacent, if logical address A maps to physical address P and logical address B maps to physical address Q under the old mapping, then changing the mapping to swap the pair of physical addresses P and Q associated with the pair of logical addresses A and B remaps logical address A to physical address Q and logical address B to physical address Q.

In further embodiments, where changing a mathematical mapping 800 for a group of logical addresses swaps pairs of physical addresses associated with pairs of logical addresses, the controller may move the data by swapping data values between pairs of physical addresses. In various embodiments, swapping data values may include reading both data values from existing locations, and writing both data values to their new locations. In a further embodiment, swapping data values may include caching the data values during the swap, so that the data values are accessible to a client during the swap. The data values that are swapped, read, or rewritten may be bytes, pages, blocks, sectors, or other data units, based on the amount of data stored at each location that an address refers to. Various further or other ways of swapping data values between pairs of physical addresses will be clear in view of this disclosure.

In the depicted embodiment, as described above, mathematical mappings 800 that apply an XOR map 804 to a logical address (or portion of a logical address) to determine a physical address (or portion of a physical address) may allow a controller to change the XOR map 804 and swap pairs of data values based on the new mappings, because each mapping 800 is its own inverse, and because the old and new mappings 800 can be applied (or reversed) in either order without changing the result. In another embodiment, however, a controller may swap data values for wear leveling by changing a mathematical mapping 800 from one involution to another involution that commutes with the first involution, regardless of whether the mathematical mappings 800 are defined in terms of a bitwise XOR with an XOR map 804 or in terms of another mathematical operation.

In certain embodiments, although changing a mapping 800 and moving data based on the changed mapping may allow a controller to level wear for a non-volatile memory element 123 or device 120, moving the data may increase wear overall. Accordingly, in certain embodiments, a controller may move data in a sequence of pair swaps, but may delay individual pair swaps to limit wear. In further embodiments, memory operations such as read and write operations requested by a host or client may be performed between individual pair swaps. Thus, when a request for a memory operation at a logical address is received, data for some logical addresses in a logical address group may be at physical locations defined by the prior mapping 800*a*, and data for other logical addresses in the group may be at physical locations defined by the changed mapping 800*b*. Thus, in certain embodiments, the controller may maintain information for the un-changed mapping 800*a* and the changed mapping 800*b*. In further embodiments, the controller may further maintain information about which mappings 800 apply to which logical address, and/or about which data values have been swapped. In one embodiment, the controller may keep track of the swap progress (to determine which mapping 800 to use for which logical address) by defining an order for swaps and by maintaining an index or counter indicating how many swaps have been performed. The controller may define an order for swaps by iterating through logical addresses for which swaps have not already been performed, iterating through physical addresses for which swaps have not already been performed, iterating in binary or Gray code order, defining a function from an n−1 bit counter value to a pair of n-bit addresses and iterating using the n−1 bit counter, or the like. Various further ways of defining a swap order will be clear in view of this disclosure. FIGS. 10 and 11 depict different embodiments of a swap order 1000 for changing a mathematical mapping 800 between logical and physical addresses.

In FIG. 10, a swap order 1000*a* includes a swap index 1006 that indicates an order for swapping pairs of data values. The tables depicted in FIG. 10 illustrate generating the swap index 1006 for a set of logical addresses 1002 in a logical address group. As in FIGS. 8 and 9, a simplified embodiment is depicted with eight three-bit logical addresses 1002 (or portions of logical addresses for a logical address group), and only the portion of the logical address 1002 affected by the mathematical mapping is depicted. In further embodiments, a logical address 1002 may include a further portion used to associate the logical address with a group via a translation table.

In certain embodiments, the controller may change a mathematical mapping by changing a single bit of a placement map, XOR map, or XOR mask for the mathematical mapping. In one embodiment, the controller may flip a single bit of the XOR mask at random. In another embodiment, the controller may increment the XOR mask or placement map in Gray code order (e.g., from one value in a reflected binary code or Gray code to the next value defined by the code). FIG. 10 depicts the unchanged or old mask 1010, or the value of the XOR mask prior to a change, as the binary value "001," and depicts the changed or new mask 1012, or the value of the XOR mask after a change, as the binary value "011," which is the subsequent value after "001" in a three-bit Gray code. Thus, the controller has changed a single bit of the placement map or XOR map—only the middle bit has changed in the change from "001" to "011."

The difference 1014 represents changed bits between the old mask 1010 and the new mask 1012, and may be calculated as a bitwise XOR of the old mask 1010 and the new mask 1012. For example, in the depicted embodiment, a difference of "010" indicates that the middle bit of the mask has changed. In a further embodiment, the controller may use the difference 1014 to identify pairs of logical addresses 1002 corresponding to pairs of physical addresses. For example, the logical address 1002 with a value of 000 mapped to physical address 001 under the old mapping and to physical address 011 under the new mapping. Conversely, the logical address 1002 with a value of 010 mapped to physical address 011 under the old mapping and maps to physical address 001 under the new mapping. Thus, the controller may move data for logical addresses 000 and 010 to the right locations under the new mapping by swapping the data values at physical addresses 001 and 011. For such a swap, the difference 1014, indicating which bits are flipped between the old mask 1010 and the new mask 1012, also indicates that the same bits are swapped between the pair of logical addresses, and between the pair of physical addresses. For example, in the depicted embodiment, because the old mask 1010 and the new mask 1012 differ at the middle bit, data for logical addresses 000 and 010, which differ at the middle bit, is swapped between physical addresses 001 and 011, which differ at the middle bit.

In certain embodiments, changing a mathematical mapping by changing a single bit of the placement map, XOR map, or XOR mask, may facilitate determining an order for swapping data based on the changed mapping. For example, in the depicted embodiment, where the difference 1014, is "010," data for pairs of logical addresses having a changed middle bit will be swapped between pairs of physical addresses having a changed middle bit. Specifically, in the depicted embodiment, data for logical addresses 000 and 010 will be swapped between physical addresses 001 and 011; data for logical addresses 001 and 011 will be swapped between physical addresses 000 and 010; data for logical addresses 100 and 110 will be swapped between physical addresses 101 and 111; and data for logical addresses 101 and 111 will be swapped between physical addresses 100 and 110.

In a further embodiment, each pair of logical addresses 1002 may be reduced to a single value by removing the bit that changes between mappings, as indicated by the difference 1014. The pairs of logical addresses 1002 may then be ordered based on the reduced value, and swaps may proceed in that order. In FIG. 10, the table to the left depicts logical addresses 1002, and reduced logical addresses 1004 with one bit removed as indicated by the difference 1014. Because the difference 1014 indicates that the middle bit changes between mappings, the middle bit of the logical addresses 1002, indicated by a dashed line, is removed. Thus, logical addresses 000 and 010 both reduce to the binary value 00, logical addresses 001 and 011 both reduce to 01, logical addresses 100 and 110 both reduce to 10, and logical addresses 101 and 111 both reduce to 11.

A swap index 1006 indicates the order in which the controller will swap data for the pairs. In various embodiments, the swap index 1006 may be based on the reduced logical address 1004. For example, in the depicted embodiment, the swap index 1006 is the reduced logical address 1004, although the swap index 1006 is depicted in decimal rather than binary notation. In another embodiment, the swap index 1006 may be obtained by transforming the reduced logical address 1004 to another value, such as by using a binary to Gray code transformation. Various other or further ways to base a swap index 1006 on a reduced logical address 1004 will be clear in view of this disclosure.

At the right of FIG. 10, a sequence of pair swaps for moving data to new locations based on a new mapping, is illustrated based on the swap index 1006. In certain embodiments, the controller may perform pair swaps 1008 in an order based on the swap index 1006. FIG. 10 depicts the logical addresses for which data will be swapped in the pair swaps 1008. Although the process of determining a swap index 1006 based on a logical address 1002 is depicted to the left of FIG. 10 and described above, the controller, in certain embodiments, may perform pair swaps 1008 in an order based on the swap index 1006, and may determine which addresses correspond to the swap index 1006 on the fly, based on the difference 1014. For example, for a swap index of 0, or binary 00, the controller may insert 0 and 1 bits at the middle position, indicated by the difference 1014, to obtain logical addresses of 000 and 010, and may then swap the data values at the corresponding physical addresses.

In a further embodiment, after swapping data values for the swap index of 0, the controller may increment the swap index to 1, or binary 01, may insert 0 and 1 bits at the middle position, indicated by the difference 1014, to obtain logical addresses of 001 and 011, and may then swap the data values at the corresponding physical addresses. Similarly, the controller may increment the swap index to 2 (binary 10), insert 0 and 1 bits at the middle position of swap index 2 to obtain logical addresses 100 and 110, and swap the data for those logical addresses. The controller may then increment the swap index to 3 (binary 11), insert 0 and 1 bits at the middle position of swap index 3 to obtain logical addresses 101 and 111, and swap the data for those logical addresses.

However, the controller may delay individual pair swaps 1008, to reduce or limit write amplification (e.g., extra writes not requested by a host or client causing additional wear on non-volatile memory cells). For example, FIG. 10 depicts a delay 1016 between the pair swaps 1008 for swap index values 0 and 1, with similar delays 1016 between swap index values 1 and 2, and between swap index values 2 and 3. In various embodiments, a controller may introduce a delay between pair swaps 1008 by delaying for a predetermined time period, waiting for a predetermined number of host writes before performing two additional write operations to swap two data values, waiting for a predetermined number of read operations before performing two write operations to swap two data values, or the like. Various ways of implementing a delay between pair swaps will be clear in view of this disclosure.

In certain embodiments, a request from a host, client, or the like to perform a memory operation, such as a read operation, a write operation, a program operation, an erase operation, or the like, may indicate a logical address for performing the memory operation. To perform the memory operation at the correct physical address, the controller may determine whether to use the old or unchanged mapping (e.g., using the old mask 1010) or the new, changed mapping (e.g., using the new mask 1012) to convert the indicated logical address to a physical address. For example, in the depicted embodiment, if the controller receives a request during the delay 1016 between swapping data values for swap index 1 and swap index 2, then data for half of the logical addresses 1002 will be at physical locations based on the new mask 1012, and data for the other half of the logical addresses 1002 will be at physical locations based on the old mask 1010.

In certain embodiments, the controller may convert a requested logical address 1002 to a swap index 1006 to determine whether to use the changed or un-changed mapping. For example, in the depicted embodiment, if the controller receives logical address 101, the controller may reduce the logical address to the reduced value 11 by removing the middle bit (as indicated by the difference 1014), and may determine that the corresponding swap index is 3 based on the reduced value 11. The controller may compare the swap index that corresponds to the requested logical address to the current value for the swap index, to determine whether to use the old mapping or the new mapping. For example, if a request for logical address 101, corresponding to swap index 3, is received during a delay 1016 before swapping data for swap index 2, the controller may determine that data has not yet been moved for the indicated logical address, and may use the old mask 1010 to convert the logical address to a physical address.

FIG. 11 depicts another embodiment of a swap order 1000b for changing a mathematical mapping between logical and physical addresses. The swap order 1000b in the depicted embodiment, is substantially similar to the swap order 1000a of FIG. 10: pair swaps 1008 are performed in an order based on a swap index 1006, and the correlation between values for the swap index 1006 and values for logical addresses 1002 is based on a difference 1014 between an old mask 1010 before a mapping change and a new mask 1012 after a mapping change. However, in the depicted embodiment, the old mask 1010 and the new mask 1012 have different values than in FIG. 10. In the depicted embodiment, the old mask 1010 is "010", and the new mask 1012 is "110," (the next value after "010" in a three-bit Gray code), and the difference 1014 is "100," indicating that the new mask 1012 differs from the old mask 1010 at the first bit position.

Thus, in the depicted embodiment, a swap for the swap index of 0 (binary 00) affects data for logical addresses 000 and 100, obtained by inserting a 0 and a 1 as bits in the first bit position of the logical address. Similarly, in the depicted embodiment, a swap for the swap index of 1 (binary 01) affects data for logical addresses 001 and 101, obtained by inserting a 0 and a 1 as bits in the first bit position of the logical address; a swap for the swap index of 2 (binary 10) affects data for logical addresses 010 and 110, obtained by inserting a 0 and a 1 as bits in the first bit position of the logical address; and a swap for the swap index of 3 (binary 11) affects data for logical addresses 011 and 111, obtained by inserting a 0 and a 1 as bits in the first bit position of the logical address. The controller may swap data for pair swaps 1008 in the order indicated by the swap index 1006, with delays 1016 between pair swaps.

As described above with reference to FIG. 10, if a controller receives a request for a memory operation at a logical address, it may determine a swap index corresponding to the requested logical address as indicated by the table on the left of the Figure. In the depicted embodiment in FIG. 11, the difference 1014 of "100" indicates that pairs of logical addresses 1002 for pair swaps 1008 differ at the first bit position; thus, a reduced logical address 1004 for a pair may be obtained by removing the first bit (indicated by a dashed line). For example, if the controller receives a request for a memory operation at logical address 101, the controller may remove the first bit to determine a reduced logical address of 01, corresponding to a swap index of 1, and may compare the determined swap index of 1 to the current swap index to determine whether data has been moved for the requested logical address or not.

In various embodiments, various other or further ways to determine an order of logical addresses or of physical addresses for performing pair swaps 1008, and for comparing a requested address to the current progress of swap operations in that order, will be clear in view of this disclosure. In various embodiments, determining a swap order may allow the controller to use a small amount of metadata, such as a difference 1014 and a swap index 1006, to record or identify what data values have been moved.

Figure 12:
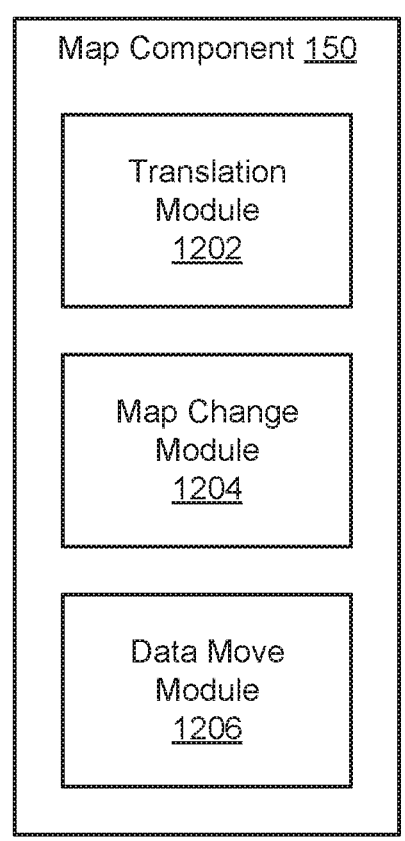
FIG. 12 is a schematic block diagram illustrating one embodiment of a map component.

FIG. 12 is a schematic block diagram illustrating one embodiment of a map component 150. The map component 150 may be substantially similar to the map component 150 described above with reference to FIGS. 1 and 2. In the depicted embodiment, the map component includes a translation module 1202, a map change module 1204, and a data move module 1206.

The translation module 1202, in one embodiment, is configured to store and/or maintain a logical-to-physical mapping for converting logical addresses to physical addresses. As described above, an "address" may be any identifier that identifies a location for reading, writing or otherwise using data, where a "physical" address refers to a fixed physical location, and a "logical" address is mappable to point or refer to a physical address. In various embodiments, the translation module 1202 may use a logical-to-physical mapping to translate logical addresses, received or indicated along with requests for read or write operations, to physical addresses for performing the operations.

The logical-to-physical mapping maintained by the translation module 1202, in one embodiment, may include a translation table that associates groups of logical addresses with groups of physical addresses. As described above with reference to FIGS. 3-7 a translation table may be a table, a hash table, a tree, or other associative data structure that associates groups of logical addresses with groups of physical addresses. For example, as depicted in FIG. 7 a translation table may map a portion of a logical address to a group of physical addresses.

In a further embodiment, the logical-to-physical mapping maintained by the translation module 1202 may include one or more mathematical mappings, where a mathematical mapping for a group of logical addresses associates individual logical addresses within the group of logical addresses with individual physical addresses within a corresponding group of physical addresses. As described above, a mathematical mapping may include a transformation, a mathematical operation, or set of operations, or the like, for calculating a physical address based on a logical address, or for calculating a portion of a physical address based on a portion of a logical address.

For example, in one embodiment, a mathematical mapping may include a mathematical transformation for determining at least a portion of a physical address based on at least a portion of a logical address, and the mathematical transformation may include an XOR operation with a placement map. For example, the translation module 1202 may use a placement map, an XOR map, an XOR mask, or the like to determine at least a portion of a physical address based on at least a portion of a logical address, as depicted in FIG. 7. The mathematical transformation may include a bitwise XOR operation of the placement map with a logical address, a portion of a logical address, or a transformed portion of the logical address. In certain embodiments, the mathematical transformation performed by the translation module 1202 may include further operations before or after the bitwise XOR operation, such as converting a portion of an address from binary to Gray code, adding or subtracting a predetermined offset to a portion of the address, left-shifting or right-shifting a portion of the address, or of the result of the bitwise XOR operation, concatenating the result of the bitwise XOR operation with a portion of a physical address, adding the result of the bitwise XOR operation to a starting physical address for a group of physical addresses, or the like.

The map change module 1204, in certain embodiments, is configured to change at least one of the mathematical mappings maintained by the translation module 1202. Changing a mapping may include recording a new definition, parameter, series of mathematical operations, or the like for a mathematical transformation that comprises the mapping. For example, where a mathematical mapping for a logical address group includes a placement map, an XOR map, an XOR mask, or the like, the map change module 1204 may change the mathematical mapping by changing the placement map, the XOR map, the XOR mask, or the like. In one embodiment, the map change module 1204 may change more than one bit of the placement map, XOR map, or XOR mask. In another embodiment, the map change module 1204 may change a single bit of the placement map, XOR map, or XOR mask. As described above with regard to FIGS. 10 and 11 changing a single bit of the placement map, XOR map, or XOR mask may facilitate determining an order for data swaps.

In certain embodiments, the translation module 1202 may maintain both an unchanged and a changed mathematical mapping for a logical address group, in response to the map change module 1204 changing the mapping. In another embodiment, the map change module 1204 may change a mathematical mapping by following a predefined sequence, such as by incrementing the placement map in Gray code order, and the translation module 1202 may maintain either the unchanged mapping or the changed mapping, while using the predefined sequence of mappings to recover the other mapping as needed.

The data move module 1206, in one embodiment, is configured to move data based on the at least one mathematical mapping changed by the map change module 1204. Moving data, as described above, may include reading data from locations based on the prior mapping, and writing data to locations based on the changed mapping. In certain embodiments, the map change module 1204 may change a mathematical mapping to swap pairs of physical addresses associated with pairs of logical addresses. For example, the map change module 1204 may select a new mathematical mapping such that a physical address translation function from old physical addresses to new physical addresses is its own inverse, as described above with regard to FIGS. 8 and 9. In a further embodiment, the data move module 1206 may move the data by swapping data values between pairs of physical addresses. For example, as described with regard to FIGS. 10 and 11, the data move module 1206 may identify pairs of logical addresses and/or corresponding pairs of physical addresses for data swaps, based on a changed placement map, XOR map, or XOR mask, and may swap data values between physical addresses in pairs.

In certain embodiments, physical locations may be evenly worn for a physical address group. In one embodiment, the map change module 1204 may delay changing a mathematical mapping for a group with evenly worn physical locations, and the data move module 1206 may be inactive until the mapping is changed. In another embodiment, the data move module 1206 may swap data values automatically or on a fixed schedule, and the map change module 1204 may record a new or nominally "changed" mathematical mapping that is the same as the old mathematical mapping, to avoid actually moving data in the scheduled swaps.

Figure 13:
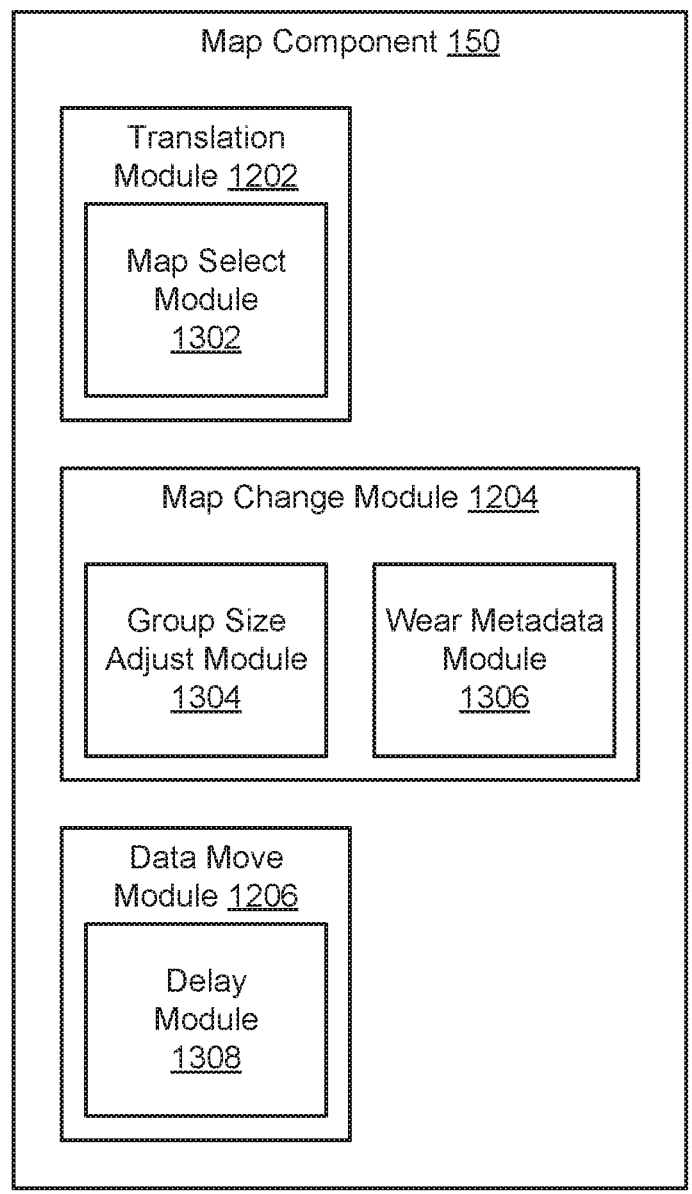
FIG. 13 is a schematic block diagram illustrating another embodiment of a map component.

FIG. 13 is a schematic block diagram illustrating another embodiment of a map component 150. The map component 150 in certain embodiments, may be substantially similar to the map component 150 described above with regard to FIGS. 1, 2, and/or 12. In the depicted embodiment, the map component 150 includes a translation module 1202, a map change module 1204, and a data move module 1206, which may be configured substantially as described above with regard to FIG. 12. The translation module 1202, in the depicted embodiment, includes a map select module 1302. The map change module 1204, in the depicted embodiment, includes a group size adjust module 1304 and a wear metadata module 1306. The data move module 1206, in the depicted embodiment, includes a delay module 1308.

In various embodiments, a controller including a map component 150 may receive a request to perform a memory operation. A memory operation may include a read operation, a write operation, a program operation, an erase operation, or the like. In certain embodiments a request to perform a memory operation may indicate a logical address, corresponding to a physical address where the requested memory operation is to be performed (e.g., where data of a write operation will be written, or where data of a read operation will be read from). In various embodiments, requests may indicate logical addresses in various ways. For example, a request may include a logical address, a range of logical address, a starting address plus an offset, an offset from the previous requested address, or the like.

In a further embodiment, the translation module 1202 may use the map select module 1302 to select either a changed mathematical mapping or an un-changed mathematical mapping to convert the requested logical address to a physical address. The map select module 1302 may select the unchanged mapping or the changed mapping by determining whether the data move module 1206 has moved the data for the logical address indicated by the request from a physical address based on the unchanged mapping to a physical address based on the changed mapping. For example, in one embodiment, the map select module 1302 may determine a swap index corresponding to the indicated logical address, and determine whether data has been moved for that swap index, as described above with regard to FIGS. 10 and 11. Various other or further ways of determining whether data has been moved for a logical address will be clear in view of this disclosure.

After using the map select module 1302 to select either a changed mathematical mapping or an un-changed mathematical mapping, the controller may perform the memory operation at a physical address based on the selected mathematical mapping. For example, the translation module 1202 may use the selected mathematical mapping to convert the requested logical address to a physical address, and the controller may perform the memory operation at the resulting physical address.

In certain embodiments, the data move module 1206 may swap data values between pairs of physical addresses based on the map change module 1204 changing a mathematical mapping, and may use the delay module 1308 to delay individual pair swaps based on a swap frequency target. The delay module 1308 may introduce a delay between pair swaps, such as the delay 1016 of FIGS. 10 and 11, in various ways. For example, in various embodiments, the delay module 1308 may introduce a delay by delaying for a predetermined time period, waiting for a predetermined number of host writes before performing two additional write operations to swap two data values, waiting for a predetermined number of read operations before performing two write operations to swap two data values, or the like. In certain embodiments, a swap frequency target may be any value or range of values used by the delay module 1308 to determine a delay between pair swaps. For example, a swap frequency target may be a number of write operations to wait between pair swaps, a number of read operations to wait between pair swaps, a time to wait between pair swaps, an approximate target time or target time range for performing the next pair swap, or the like. Various other or further types of swap frequency targets will be clear in view of this disclosure.

In certain embodiments, however, delaying data swaps for a changed mathematical mapping may result in multiple writes to a logical address being written to the same physical location before data is swapped to a new physical address for that logical address, causing uneven wear at one physical location. The time or number of writes to fully move data for a logical address group and a corresponding physical address group based on a changed mapping may depend on the size of the group. For example, in one embodiment, if the swap frequency target is to swap one pair of data values for every 100 host writes, then a group of 20,000 addresses will have data fully moved to new physical addresses based on a changed mathematical mapping after 10,000 pair swaps, and the 10,000 pair swaps will be performed over the course of 1,000,000 host writes. If the endurance of a physical memory location is approximately one million writes, then worst-case repeated writes to a single logical address could result in failure of a physical location before data for the logical address is moved to a new location. By contrast, in another embodiment, with the same endurance of one million writes and the same swap frequency target of 1 data swap per 100 host writes, a smaller group of 2,000 addresses would have data fully moved to new physical addresses based on a changed mathematical mapping after 1,000 pair swaps, taking place over the course of 100,000 host writes. Thus, repeated writes to a single logical address would be redirected to a new physical address after no more than 100,000 host writes, thereby leveling wear and avoiding premature failure of the physical memory locations.

Accordingly, in certain embodiments, the map change module 1204 may use a group size adjust module 1304 to set or adjust a group size for a group of physical addresses and a corresponding group of logical addresses based on the swap frequency target used by the delay module 1308. In various embodiments, the map change module 1204 may set group sizes for a translation table and may determine group definitions. In another embodiment, the map change module 1204 may adjust group sizes by splitting groups, as described above with reference to FIG. 5, or by merging groups, as described above with reference to FIG. 6. In certain embodiments, the group size adjust module 1304 may merge (or otherwise enlarge) groups to reduce write amplification (as swaps would be performed in sequence in one larger group rather than in parallel in two smaller groups). In another embodiment, the group size adjust module 1304 may split (or otherwise shrink) groups to increase the frequency of swaps where more frequent wear leveling would be useful (as swaps would be performed independently for the smaller split groups). The group size adjust module 1304 may provide larger groups if swaps are performed more frequently (e.g., if the swap frequency target provides less delay between swaps), and may provide smaller groups if swaps are performed less frequently (e.g., if the swap frequency target provides more delay between swaps). In certain embodiments, the group size adjust module 1304 may use the swap frequency target to determine a worst case number of writes to a physical location between mapping changes, a probability for a number of writes to a physical location between mapping changes to exceed an endurance threshold, a likely number of writes to a physical location between mapping changes, or the like, and may determine or set a group size accordingly.

In certain embodiments, the map change module 1204 may change a mathematical mapping for a group of logical addresses by selecting a new mapping based on metadata for the logical and/or physical addresses. In certain embodiments, the wear metadata module 1306 may track, maintain, and/or store metadata that records wear for logical addresses and wear for physical addresses, and the map change module 1204 may change a mathematical mapping based on the wear metadata. Wear metadata for logical addresses may include information such as how frequently a logical address is used, how many times a logical address has been used in a certain period of time, or the like. Similarly, wear metadata for physical addresses may include information such as how frequently a physical address is used, how many times a physical address has been used in a certain period of time, a total number of program/erase cycles for the physical address or the like. As further examples, in various embodiments, wear metadata for logical and/or physical addresses may include a total count of activity, a rate of activity, a rate of activity weighted or filtered to give more weight to recent activity or to reduce the impact of older activity, and/or counts, rates, or other measurements for different types of activity, such as separate read counts and write counts. Various other or further types of wear metadata will be clear in view of this disclosure.

In certain embodiments, the map change module 1204 may use metadata recorded by the wear metadata module 1306 to select a new mathematical mapping for a logical address group. For example, in one embodiment, the map change module 1204 may remap frequently used logical addresses to less-frequently used physical addresses. In a further embodiment, however, using a mathematical mapping to map logical addresses to physical addresses may provide less flexibility for remapping than an any-to-any mapping. For example, an any-to-any mapping might be selected to map the most frequently used logical address in a group to the least worn physical address in a group, the next most frequently used logical address to the next least worn physical address, and so on. By contrast, a mathematical mapping, such as a mapping based on an XOR mask to facilitate swapping pairs of data values to their intended locations, may have less flexibility to remap frequently used logical addresses to less-frequently used physical addresses. In a certain embodiment, the map change module 1204 may use the wear metadata module 1306 to predict future wear associated with different mappings in a set of possible changed mappings and may select a changed mapping that minimizes the wear, results in a wear increase below a wear threshold, or the like. Various other or further ways of selecting a mathematical mapping based on wear metadata will be clear in view of this disclosure.

Figure 14:
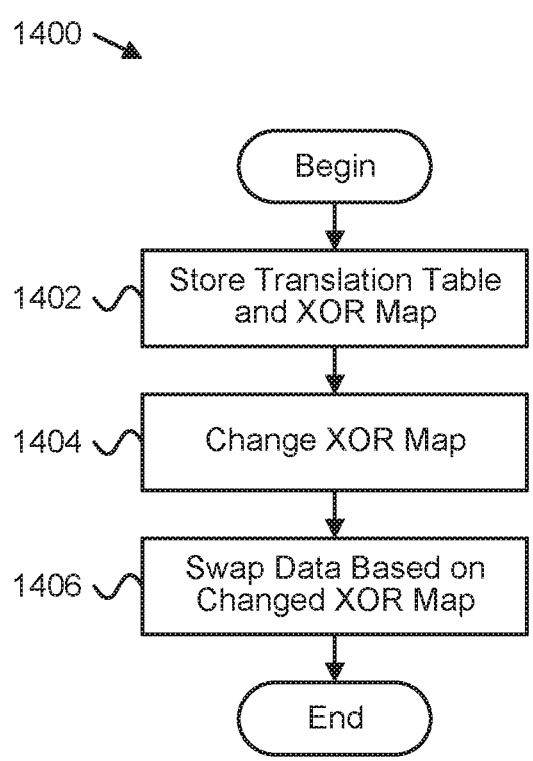
FIG. 14 is a schematic flow chart diagram illustrating one embodiment of a method for mapping-based wear leveling for non-volatile memory.

FIG. 14 is a schematic flow chart diagram illustrating one embodiment of a method 1400 for mapping-based wear leveling for non-volatile memory. The method 1400 begins, and a translation module 1202 stores 1402 a translation table that associates groups of logical addresses with groups of physical addresses, and an XOR map for associating individual logical addresses within the group of logical addresses with individual physical addresses within a corresponding group of physical addresses. A map change module 1204 changes 1404 the XOR map. A data move module 1206 swaps 1406 data between physical addresses based on the changed XOR map, and the method 1400 ends.

Figure 15:
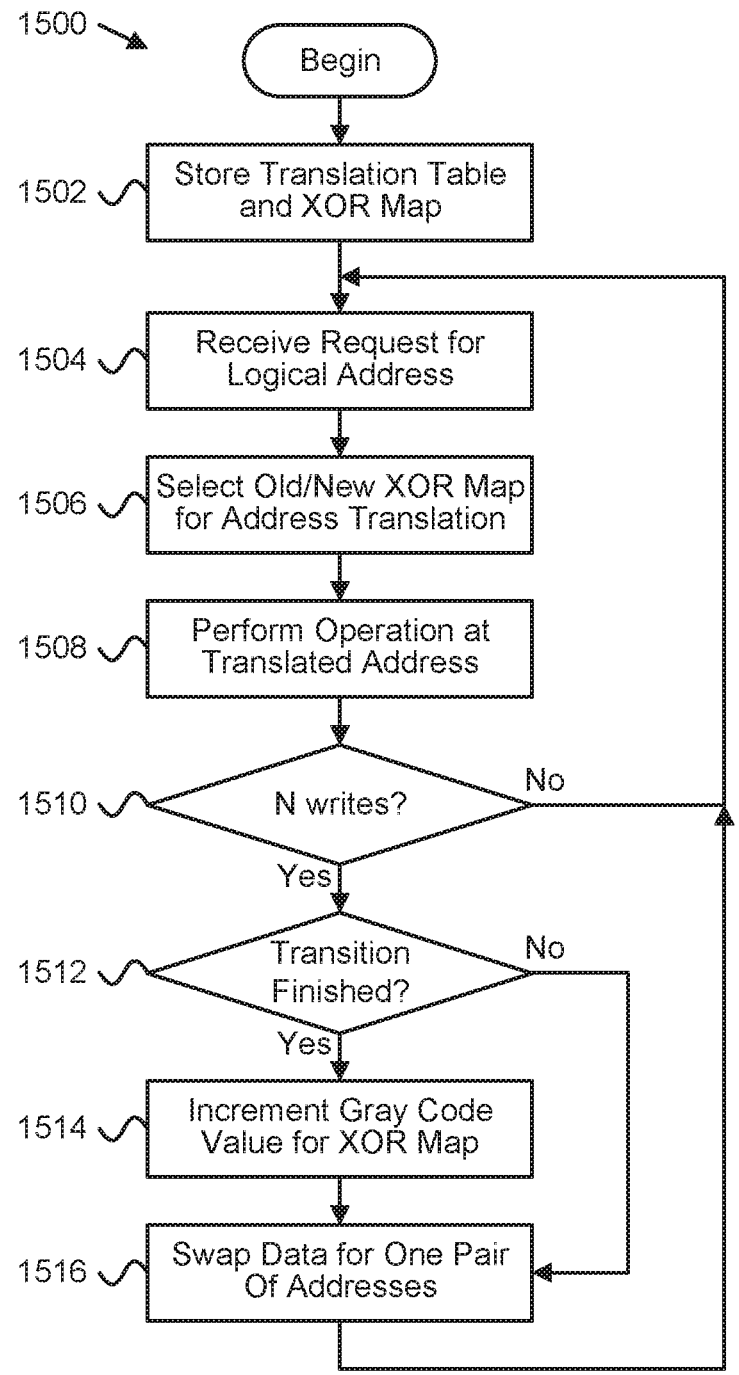
FIG. 15 is a schematic flow chart diagram illustrating another embodiment of a method for mapping-based wear leveling for non-volatile memory.

FIG. 15 is a schematic flow chart diagram illustrating another embodiment of a method 1500 for mapping-based wear leveling for non-volatile memory. The method 1500 begins, and a translation module 1202 stores 1502 a translation table that associates groups of logical addresses with groups of physical addresses, and an XOR map for associating individual logical addresses within the group of logical addresses with individual physical addresses within a corresponding group of physical addresses. A map component 150 receives 1502 a request for performing a memory operation at a logical address. A map select module 1302 selects 1506 a changed XOR map or an unchanged XOR map for translating the logical address to a physical address. A controller performs 1508 the requested memory operation at the translated address.

A delay module 1308 determines 1510 whether a number of data writes since a data swap exceeds a swap frequency target, such as a threshold of N data writes. If N data writes have not occurred, the map component 150 may receive 1504 another request for a memory operation, and the method 1500 may continue. If N data writes have occurred since a data swap, the map component 150 determines 1512 whether a transition from the unchanged XOR map to the changed XOR map is finished. If the transition is not finished, the data move module 1206 swaps 1516 data between one pair of physical addresses based on the changed XOR map. If the transition to a changed XOR map is finished, the map change module 1204 increments 1514 the XOR map from one Gray code value to the next value in the Gray code, and the data move module 1206 swaps 1516 data between one pair physical addresses based on the incremented XOR map. After swapping 1516 one pair of data values, the method 1500 continues with the map component 150 receiving 1504 further requests, and swapping 1516 further data pairs after delays of N writes.

A means for mapping a first portion of a logical address to a group of physical addresses, in various embodiments, may include a translation table, storage or memory media for storing a translation table, a translation module 1202, a map component 150, a die controller 206, a device controller 126, a device driver, other logic hardware, and/or other executable code stored on a computer readable storage medium. Other embodiments may include similar or equivalent means for mapping a first portion of a logical address to a group of physical addresses.

A means for applying an XOR mask to a second portion of the logical address to determine a physical address within the group, in various embodiments, may include an XOR mask, storage or memory media for storing the XOR mask, one or more XOR gates for applying the XOR mask, a processor configured to apply the XOR mask, a translation module 1202, a map component 150, a die controller 206, a device controller 126, a device driver, other logic hardware, and/or other executable code stored on a computer readable storage medium. Other embodiments may include similar or equivalent means for applying an XOR mask.

A means for changing an XOR mask, in various embodiments, may include a map change module 1204, a map component 150, a die controller 206, a device controller 126, a device driver, other logic hardware, and/or other executable code stored on a computer readable storage medium. Other embodiments may include similar or equivalent means for changing an XOR mask.

A means for swapping data between physical addresses within a group based on a changed XOR mask, in various embodiments, may include a data move module 1206, a map component 150, a die controller 206, a device controller 126, a device driver, other logic hardware, and/or other executable code stored on a computer readable storage medium. Other embodiments may include similar or equivalent means for swapping data.

A means for delaying data swaps based on a swap frequency target, in various embodiments, may include a delay module 1308, a map component 150, a die controller 206, a device controller 126, a device driver, other logic hardware, and/or other executable code stored on a computer readable storage medium. Other embodiments may include similar or equivalent means for delaying data swaps.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
one or more non-volatile memory elements; and
a controller configured to:
maintain a logical-to-physical mapping for converting logical addresses to physical addresses, the logical-to-physical mapping comprising a group-to-group translation table that provides any-to-any mapping between groups of logical addresses and groups of physical addresses, and one or more mathematical mappings, wherein a mathematical mapping for a group of logical addresses associates individual logical addresses within the group of logical addresses with individual physical addresses within a corresponding group of physical addresses;
change at least one of the mathematical mappings; and
move data based on the changed at least one mapping.

2. The apparatus of claim 1, wherein changing at least one of the mathematical mappings swaps pairs of physical addresses associated with pairs of logical addresses, and moving the data comprises swapping data values between pairs of physical addresses.

3. The apparatus of claim 2, wherein swapping data values between pairs of physical addresses comprises delaying individual pair swaps based on a swap frequency target.

4. The apparatus of claim 3, wherein a group size for a group of physical addresses is based on the swap frequency target.

5. The apparatus of claim 1, wherein a mathematical mapping comprises a mathematical transformation for determining at least a portion of a physical address based on at least a portion of a logical address, wherein a mathematical transformation comprises an XOR operation with a placement map.

6. The apparatus of claim 5, wherein changing a mathematical mapping comprises changing the placement map.

7. The apparatus of claim 5, wherein changing a mathematical mapping comprises changing a single bit of the placement map.

8. The apparatus of claim 5, wherein changing a mathematical mapping comprises incrementing the placement map in Gray Code order.

9. The apparatus of claim 1, wherein the controller is further configured to:
receive a request to perform a memory operation, the request indicating a logical address;
select one of a changed mathematical mapping and an un-changed mathematical mapping to convert the logical address to a physical address; and
perform the memory operation at a physical address based on the selected mathematical mapping.

10. The apparatus of claim 9, wherein selecting a mapping comprises determining whether data has been moved for the logical address of the memory operation request.

11. The apparatus of claim 1, wherein changing at least one of the mathematical mappings comprises selecting a new mapping based on metadata, the metadata recording wear for logical addresses and wear for physical addresses.

12. The apparatus of claim 1, wherein the controller is further configured to merge two groups by updating the translation table, determine a new mathematical mapping for the merged group, and move data based on the new mathematical mapping.

13. The apparatus of claim 1, wherein the controller is further configured to split a group into two groups by updating the translation table.

14. A method comprising:
storing a logical-to-physical mapping for converting logical addresses to physical addresses, the logical-to-physical mapping comprising a group-to-group translation table that provides any-to-any mapping between groups of logical addresses and groups of physical addresses, and one or more mathematical mappings, wherein a mathematical mapping for a group of logical addresses associates individual logical addresses within the group of logical addresses with individual physical addresses within a corresponding group of physical addresses, a mathematical mapping comprising an XOR map for determining at least a portion of a physical address based on at least a portion of a logical address;
changing an XOR map for at least one of the mathematical mappings; and
swapping data between physical addresses based on the changed XOR map.

15. The method of claim 14, wherein swapping data comprises delaying individual pair swaps based on a swap frequency target.

16. The method of claim 15, wherein a group size for a group of physical addresses is based on the swap frequency target.

17. The method of claim 14, wherein changing the XOR map comprises incrementing the XOR map in Gray Code order.

18. The method of claim 14, further comprising:
receiving a request to perform a memory operation, the request indicating a logical address;
selecting one of a changed XOR map and an un-changed XOR map to convert the logical address to a physical address; and
performing the memory operation at a physical address based on the selected XOR map.

19. An apparatus comprising:
means for mapping a first portion of a logical address to a group of physical addresses, wherein the means for mapping a first portion of a logical address to a group of physical addresses provides group-to-group, any-to-any mapping between groups of logical addresses and groups of physical addresses;
means for applying an XOR mask to a second portion of the logical address to determine a physical address within the group;
means for changing the XOR mask; and
means for swapping data between physical addresses within the group based on the changed XOR mask.

20. The apparatus of claim 19, further comprising means for delaying data swaps based on a swap frequency target.

* * * * *